US012748422B2

(12) United States Patent
Montoya et al.

(10) Patent No.: US 12,748,422 B2
(45) Date of Patent: Sep. 29, 2026

(54) APPARATUSES, COMPUTER-IMPLEMENTED METHODS, AND COMPUTER PROGRAM PRODUCT TO ASSIST AERIAL VEHICLE PILOT FOR VERTICAL LANDING AND/OR TAKEOFF

(71) Applicant: Honeywell International Inc., Charlotte, NC (US)

(72) Inventors: Roberto Gudino Montoya, Scottsdale, AZ (US); Yash Lakhmichand Thawani, Maharashtra (IN); Subash Samuthirapandian, Bangalore (IN); Rahul Pradhan, Bangalore (IN); Mohammed Ibrahim Mohideen, Bangalore (IN); Jacob Kirk Maxfield, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/628,524

(22) Filed: Apr. 5, 2024

(65) Prior Publication Data

US 2024/0248470 A1 Jul. 25, 2024

Related U.S. Application Data

(63) Continuation of application No. 17/646,702, filed on Dec. 31, 2021, now Pat. No. 11,977,379.

(30) Foreign Application Priority Data

Nov. 19, 2021 (IN) ............................ 202111053255

(51) Int. Cl.

*G05D 1/00* (2024.01)
*B64C 39/02* (2023.01)
(Continued)

(52) U.S. Cl.

CPC ......... *G05D 1/0044* (2013.01); *B64C 39/024* (2013.01); *B64D 47/08* (2013.01);
(Continued)

(58) Field of Classification Search

CPC .. G05D 1/0044; B64U 70/00; B64U 2201/20; B64U 2101/30; B64U 10/10; B64U 10/20; B64U 70/95; B64U 70/97
See application file for complete search history.

(56) References Cited

U.S. PATENT DOCUMENTS 7,106,217 B2 9/2006 Judge et al.
7,642,929 B1 1/2010 Pinkus et al.
(Continued)

FOREIGN PATENT DOCUMENTS

CH 710335 A2 5/2016
CN 112173141 A 1/2021
(Continued)

OTHER PUBLICATIONS

Translation of CN 112173141 A specification with paragraph numbers (Year: 2021).*
(Continued)

*Primary Examiner* — Kenneth M Dunne
(74) *Attorney, Agent, or Firm* — Alston & Bird LLP

(57) ABSTRACT

An apparatus includes at least one processor and at least one non-transitory memory having computer-coded instructions stored thereon that, in execution with the at least one processor, cause the apparatus to receive flight sensor data associated with an aerial vehicle operating in an environment, generate a virtual environment based at least in part on the flight sensor data, generate, within the virtual environment, a virtual corridor defining a volume within which the aerial vehicle is safe to operate, and cause rendering of a user interface comprising at least one visualization interface
(Continued)

depicting at least the virtual corridor together with a transition point at which a vertical takeoff or a vertical landing is to commence is indicated.

19 Claims, 16 Drawing Sheets

(51) Int. Cl.
*B64D 47/08* (2006.01)
*B64U 70/00* (2023.01)
*B64U 101/30* (2023.01)

(52) U.S. Cl.
CPC ......... *G05D 1/0038* (2013.01); *G05D 1/0094* (2013.01); *G05D 1/101* (2013.01); *B64U 70/00* (2023.01); *B64U 2101/30* (2023.01); *B64U 2201/20* (2023.01)

(56) References Cited

U.S. PATENT DOCUMENTS

| | | | |
|---|---|---|---|
| 8,576,094 | B2 | 11/2013 | Suddreth et al. |
| 8,918,234 | B2 | 12/2014 | Covington et al. |
| 10,901,419 | B2 | 1/2021 | Liu et al. |
| 11,435,762 | B1 | 9/2022 | Auerbach et al. |
| 11,977,379 | B2 | 5/2024 | Montoya et al. |
| 2004/0183697 | A1 | 9/2004 | Rogers et al. |
| 2009/0132100 | A1 | 5/2009 | Shibata |
| 2009/0251540 | A1 | 10/2009 | Aspen |
| 2009/0281684 | A1 | 11/2009 | Spek |
| 2010/0052949 | A1 | 3/2010 | Suddreth et al. |
| 2012/0314032 | A1 | 12/2012 | Muensterer et al. |
| 2013/0138275 | A1 | 5/2013 | Nauman et al. |
| 2013/0261850 | A1 | 10/2013 | Smith et al. |
| 2014/0207315 | A1 | 7/2014 | He |
| 2015/0259075 | A1 | 9/2015 | Case et al. |
| 2016/0152348 | A1 | 6/2016 | Mohideen et al. |
| 2018/0009546 | A1 | 1/2018 | Filias et al. |
| 2018/0115699 | A1 | 4/2018 | Lovaasen et al. |
| 2018/0222602 | A1 | 8/2018 | Salesse-Lavergne |
| 2020/0094948 | A1 | 3/2020 | Adachi et al. |
| 2020/0116521 | A1* | 4/2020 | Barber .................. G06T 19/006 |
| 2020/0334993 | A1 | 10/2020 | Demri et al. |
| 2021/0020055 | A1 | 1/2021 | Bazawada et al. |
| 2021/0225180 | A1 | 7/2021 | S et al. |
| 2022/0017235 | A1 | 1/2022 | Lee et al. |
| 2022/0136860 | A1 | 5/2022 | Dong et al. |
| 2022/0413514 | A1 | 12/2022 | Moy et al. |
| 2023/0016277 | A1 | 1/2023 | Bravo Orellana |

FOREIGN PATENT DOCUMENTS

| | | | |
|---|---|---|---|
| CN | 113156990 | A | 7/2021 |
| KR | 10-2015-0090539 | A | 8/2015 |

OTHER PUBLICATIONS

Advisory Action (PTOL-303) Mailed on Dec. 15, 2023 for U.S. Appl. No. 17/646,702, 3 page(s).
Daehler, "Visual-conformal display format for helicopter guidance", Jun. 2014, SPIE (Year: 2014).
EP Office Action Mailed on Jul. 10, 2024 for EP Application No. 22204708, 7 page(s).
Ernst et al, "Virtual Reality Headsets as external vision displays for helicopter operations: the potential of an exocentric viewpoint", May 2019, SPIE, (Year: 2019).
Examiner Interview Summary Record (PTOL-413) Mailed on Aug. 24, 2023 for U.S. Appl. No. 17/646,702, 2 page(s).
Extended European search report Mailed on May 4, 2023 for EP Application No. 22204708, 14 page(s).
Final Rejection Mailed on Oct. 5, 2023 for U.S. Appl. No. 17/646,702, 35 page(s).
Franklin, "Flight Evaluation of Advanced Controls and Displays for Transition and Landing on the NASA V/STOL Systems Research Aircraft", Apr. 1996 (Year: 1996).
Jennings, Chad, et al., "3-D Perspective Displays for Guidance and Traffic Awareness", Proceedings of the 12th International Technical Meeting of the Satellite Division of the Institute of Navigation (Ion Gps 1999), Sep. 14-17, 1999, pp. 1923-1930, Nashville, TN.
Lueken, "Helmet mounted display supporting helicopter missions during en route flight and landing", May 2016 (Year: 2016).
Machine translation of CH 710335 A2 (Year: 2016).
Machine translation of CN 112173141 A (Year: 2021).
Non-Final Rejection Mailed on May 22, 2023 for U.S. Appl. No. 17/646,702, 32 page(s).
Notice of Allowance and Fees Due (PTOL-85) Mailed on Feb. 5, 2024 for U.S. Appl. No. 17/646,702, 7 page(s).
Office Action Appendix Mailed on Aug. 24, 2023 for U.S. Appl. No. 17/646,702, 6 page(s).
EP Office Action Mailed on Nov. 14, 2025 for EP Application No. 22204708, 5 page(s).

* cited by examiner

APPARATUSES, COMPUTER-IMPLEMENTED METHODS, AND COMPUTER PROGRAM PRODUCT TO ASSIST AERIAL VEHICLE PILOT FOR VERTICAL LANDING AND/OR TAKEOFF

CROSS-REFERENCE TO RELATED APPLICATIONS

This application is a continuation of U.S. application Ser. No. 17/646,702, filed Dec. 31, 2021, which claims priority to Indian provisional Application Ser. No. 202111053255, filed Nov. 19, 2021, each of which is incorporated by reference in their entireties.

TECHNICAL FIELD

Embodiments of the present disclosure generally relate to improved operation of aerial vehicles, and specifically to generation of UAM visualization interface(s) depicting a virtual corridor in a virtual environment.

BACKGROUND

In various aerial vehicles, displays provide different user interfaces in an attempt to help a pilot navigate and control the vehicle. However, in certain contexts, the user interfaces provided via such displays do not provide adequate information to help a pilot successfully perform particular maneuvers. For example, in the context of takeoff and landing of an urban air mobility (UAM) vehicle, such user interfaces are often overly cluttered and/or do not provide information that is sufficiently helpful to pilots. Applicant has discovered problems with current implementations of user interfaces provided in aerial vehicles. Through applied effort, ingenuity, and innovation, Applicant has solved many of these identified problems by developing embodied in the present disclosure, which are described in detail below.

BRIEF SUMMARY

In accordance with a first aspect of the disclosure, a computer-implemented method is provided for generating improved user interface(s) including specially configured UAM visualization interface(s). In some embodiments the computer-implemented method is executable by one or more computing device(s) embodied in hardware, software, firmware, and/or any combination thereof as described herein. In some example embodiments the example computer-implemented method includes receiving flight sensor data associated with an aerial vehicle operating in an environment. The example computer-implemented method further includes generating a virtual environment based at least in part on the flight sensor data. The example computer-implemented method further includes generating, within the virtual environment, a virtual corridor defining a volume within which the aerial vehicle is safe to operate, the virtual corridor extending from a landing zone of the environment. The example computer-implemented method further includes causing rendering of a user interface including at least one UAM visualization interface depicting a representation of at least a portion of the virtual environment, the representation depicting at least the virtual corridor.

In some example embodiments of the example computer-implemented method, the user interface includes a plurality of UAM visualization interfaces, the plurality of UAM visualization interfaces includes an egocentric view depicting a first projection of the virtual environment, the first from a virtual vehicle corresponding to the aerial vehicle; an exocentric view depicting a second projection of the virtual environment, the exocentric view including a representation of the virtual vehicle; and a profile view depicting a third projection of the virtual environment, the profile view including a side profile of the virtual vehicle.

In some example embodiments of the example computer-implemented method, the example computer-implemented method further includes automatically detecting a change in operational mode of the aerial vehicle; and causing rendering, to the user interface, of an additional UAM visualization interface in response to detecting the change in operational mode of the aerial vehicle.

In some example embodiments of the example computer-implemented method, the example computer-implemented method further includes automatically detecting a change in operational mode of the aerial vehicle; and causing de-rendering, from the user interface, of a particular UAM visualization interface of the at least one UAM visualization interface.

In some example embodiments of the example computer-implemented method, the user interface includes a first sub-interface including a first UAM visualization interface of the at least one UAM visualization interface and a second sub-interface of the at least one UAM visualization interface, the first UAM visualization interface rendered side-by-side with the second UAM visualization interface.

In some example embodiments of the example computer-implemented method, the computer-implemented method further includes causing rendering, to an additional flight display of the aerial vehicle, of a second user interface including at least a second UAM visualization interface depicting a second representation of at least a second portion of the virtual environment.

In some example embodiments of the example computer-implemented method, the virtual corridor is generated based at least in part on the flight sensor data and flight detail data associated with the aerial vehicle.

In some example embodiments of the example computer-implemented method, the virtual corridor includes a plurality of range indications, each range indication depicting a range between the range indication and the landing zone.

In some example embodiments of the example computer-implemented method, the example computer-implemented method further includes detecting a change in operational mode; and altering an orientation of a camera associated with the aerial vehicle, where at least one of the at least one UAM visualization interface is generated based at least in part on data captured by the camera.

In some example embodiments of the example computer-implemented method, the flight sensor data includes image data associated with at least the portion of the environment, and at least one of the at least one UAM visualization interface includes the virtual corridor augmenting the image data.

In some example embodiments of the example computer-implemented method, at least one of the at least one UAM visualization interface comprises at least one deviation indicator indicating an offset from a center point of the landing zone in at least one direction.

In accordance with a second aspect of the disclosure, an apparatus is provided for generating improved user interface(s) including specially configured UAM visualization interface(s). In one example embodiment of the apparatus, an example apparatus includes at least one processor and at least one memory having computer-coded instructions stored thereon that, in execution with the at least one processor, causes the apparatus to perform any one of the computer-implemented methods described herein. A second example apparatus includes means for performing each step of any one of the computer-implemented methods described herein.

In accordance with a third aspect of the disclosure, a computer program product is provided for generating improved user interface(s) including specially configured UAM visualization interface(s). In one example embodiments of the computer program product, an example computer program product includes at least one non-transitory computer-readable storage medium having computer program code stored thereon that, in execution with at least one processor, is configured for performing any one of the example computer-implemented methods described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
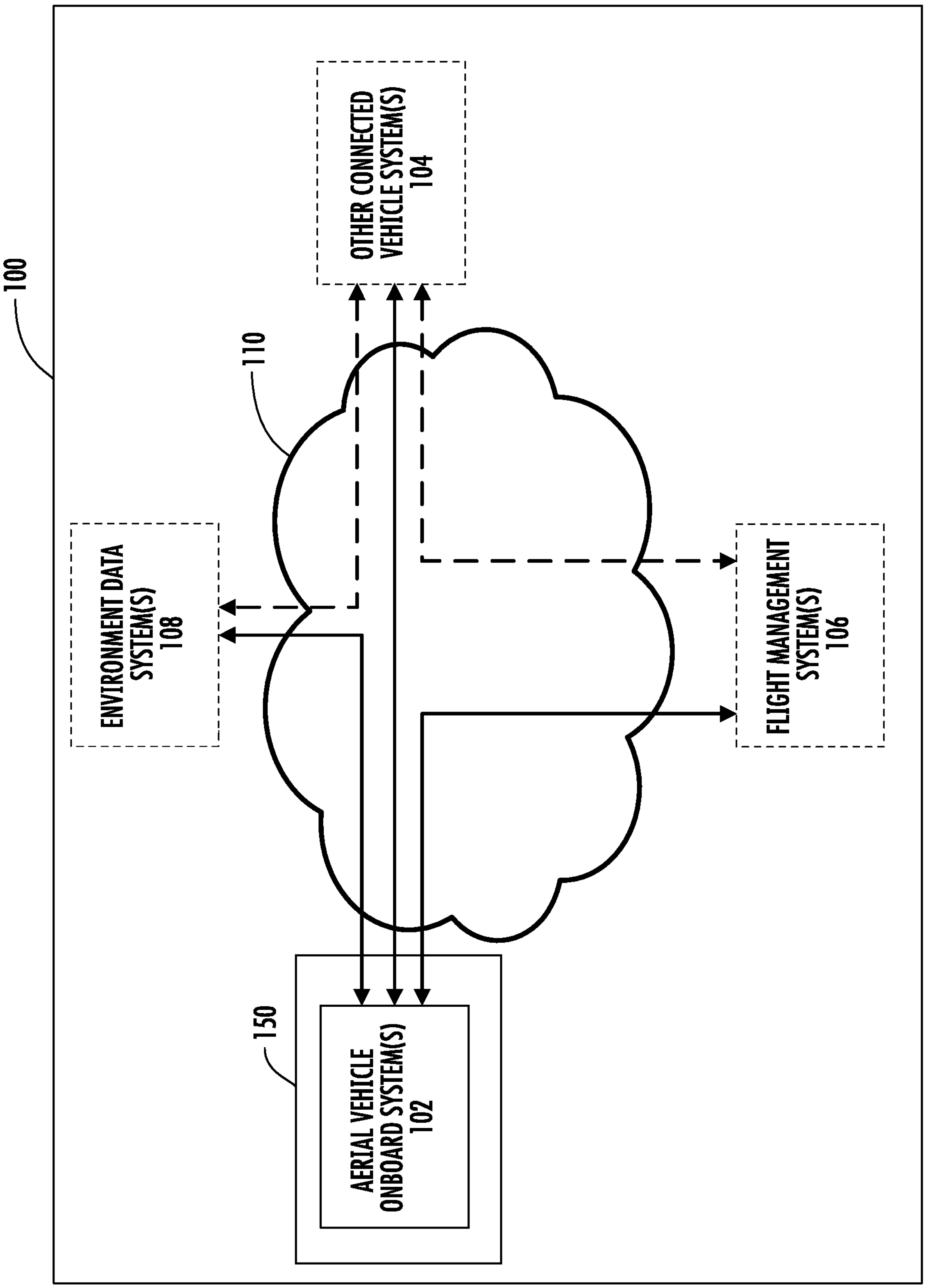
FIG. 1 illustrates a system for enabling aerial vehicle control in accordance with at least some embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, user interface(s) are rendered to display(s) of an aerial vehicle that assist a pilot with controlling the vehicle. For example, in such contexts, user interface(s) are rendered that include various data value(s) associated with operation, movement, and/or other control of the aerial vehicle as it moves throughout an environment (e.g., via manual, autonomous, and/or semi-autonomous movement). However, in various circumstances the user interface(s) lack sufficient data to assist the pilot in such circumstances. In circumstances where the aerial vehicles perform vertical takeoff and/or landing capabilities, the generated user interface(s) fail to provide information that enables the pilot to control the aerial vehicle in a controlled manner during such operations. For example, a pilot of an aerial vehicle that performs vertical takeoff and/or vertical landing often is blocked from having visual contact with a landing zone from which the aerial vehicle is taking off or to which the aerial vehicle is landing. Additionally or alternatively, for example, due to changes in weather condition the pilot's ability to control the aerial vehicle with sufficient accuracy as visibility decreases. In the context of urban air mobility, such inability to accurately control the aerial vehicle could lead to crash(es), unsafe control, and/or other disaster(s) during vertical takeoff and/or vertical landing in an environment with limited space, for example due to tight spacing between structures. For at least these reasons, the data value(s) rendered to such user interface(s) are insufficient to assist a pilot during all operation of the aerial vehicle. The inventors have identified a need for improved representations of a state of operation of an aerial vehicle, user interface(s) associated therewith, and associated views and/or symbologies associated therewith.

Embodiments of the present disclosure provide improved user interface(s) that include particularly configured UAM visualization interface(s). Each UAM visualization interface(s) provides additional contextual information that enhances a pilot's situational awareness while operating an aerial vehicle for a various maneuvers, including vertical takeoff and/or vertical landing in an urban environment or otherwise. In some embodiments, one or more UAM visualization interface(s) a representation of a virtual corridor and a representation of a virtual vehicle, where the virtual vehicle corresponds to an aerial vehicle within a virtual environment. In some such embodiments, the virtual vehicle corresponds to the aerial vehicle within a virtual environment that corresponds to a real-world environment in which the aerial vehicle is operating. The representation of the virtual corridor provides a visual indication of a safe volume within which the pilot may operate the aerial vehicle, for example while performing a vertical takeoff or vertical landing. Additionally, in some embodiments, the virtual corridor includes, and/or a corresponding UAM visualization interface within which the virtual corridor is represented, includes one or more specially configured indicator(s) that provide an intuitive representation of operational parameters (e.g., altitude, speed, and/or the like) to the pilot for steering safely and softly towards a landing zone.

Additionally or alternatively, in some embodiments, user interface(s) are generated including a plurality of UAM visualization interfaces, each depicting a virtual vehicle in a virtual environment from different views. In this regard, the different views represented by the UAM visualization interfaces convey one or more data values in different, intuitive contexts to the pilot of the aerial vehicle. For example, in some embodiments, UAM visualization interface(s) embodying an egocentric view, a profile view, and/or an exocentric view are provided that depict different representations of the virtual environment corresponding to a real-world environment, with accurate and intuitive depiction of the relationship between the aerial vehicle and a landing zone utilizing the virtual corridor in the corresponding virtual environment. Such embodiments enable a pilot to increase their situational awareness further by utilizing each of the UAM visualization interfaces.

Embodiments of the present disclosure provide a myriad of technical advantages. Some embodiments utilize interface(s) a virtual corridor to intuitively indicate, to a pilot of an aerial vehicle, a safe area for operation during vertical takeoff from a landing zone and/or vertical landing to a landing zone. Some embodiments include UAM visualization interface(s) that depict one or more view(s) of a virtual environment corresponding to a real-world environment and including a representation of a virtual vehicle corresponding to an aerial vehicle in the real-world environment. In this regard, the UAM visualization interface(s) are configured to provide particular depictions that enhance the situational awareness that may be garnered from such interface(s) without reliance on the pilot's visual confirmation of the actual, real-world environment. Some such embodiments thereby provide UAM visualization interface(s) that provide improved situational awareness even in circumstances where the pilot cannot see the relevant portions of the real-world environment, for example due to being blocked by part(s) of the aerial vehicle itself (e.g., the floor or ceiling) or external factors such as inclement weather. In some embodiments, UAM visualization interface(s) are provided that combine depiction(s) of the virtual corridor with depiction(s) of the virtual vehicle that accurately correspond to an actual vehicle in a real-world environment to enable a pilot to intuitively control the aerial vehicle for particular operations, such as vertical takeoff and/or vertical landing, based at least in part on the depicted relationship between the virtual corridor and the virtual vehicle. In this regard, embodiments of the present disclosure generate user interface(s) described herein that include specially configured UAM visualization interface(s) that provide various perspective(s) of an environment and/or operation of an aerial vehicle. Such user interfaces and/or specially configured UAM visualization interface(s) intuitively convey improved and critical situational awareness unique to operation during vertical takeoff and landing phases of a UAM aerial vehicle to an operator of said aerial vehicle.

Additionally or alternatively, in some embodiments, user interface(s) including one or more UAM visualization interface(s) further include limited interface element(s) to provide sufficient context and situational awareness to a pilot while simultaneously de-cluttering the remainder of the interface(s). In some embodiments, the improved user interface(s) described herein is/are further de-cluttered based on changing of an operational mode of an aerial vehicle. In some such embodiments, user interface(s) render particular UAM visualization interface(s) relevant to operation(s) performed in particular and/or upon detection of particular data-driven trigger(s), and/or de-renders particular UAM visualization interface(s) no longer relevant based at least in part on changes in operational mode of an aerial vehicle and/or particular data-driven trigger(s). In this regard, embodiments of the present disclosure reduce the visual clutter of user interface(s) provided to a pilot to emphasize the interface element(s) relevant to a pilot at particular points in performed operation(s).

Definitions

"Aerial vehicle" refers to any vehicle capable of air travel. Non-limiting examples of aerial vehicles include urban air mobility vehicles, drones, helicopters, fully autonomous air vehicles, semi-autonomous air vehicles, and airplanes.

"Egocentric view" refers to a visual depiction of an environment via a viewport defined in an environment from the first-person perspective positioned at or along an object. With respect to an aerial vehicle, an egocentric view depicts a viewport defined from a position of or along the exterior of the aerial vehicle, for example and without limitation a position of a sensor, a camera, a midpoint of the aerial vehicle, or a center of gravity of the aerial vehicle.

"Environment" refers to any spatial area in two or more dimensions. A "real-world environment" refers to a three-dimensional volume in the real world. A "virtual environment" refers to a computer-generated environment, which represents one or more aspects of a corresponding real-world environment.

"Exocentric view" refers to a visual depiction of an environment via a viewport defined in an environment from a third-person perspective positioned offset from an object. One or more modifier(s) may be attributed to an egocentric view that describe the offset between the aerial vehicle and the viewport, for example a "rear exocentric view" in some embodiments refers to an offset between a position associated with an object and a viewport that is at least positioned behind the object with respect to a forward-facing axis.

"Flight sensor data" refers to electronically managed data utilized by an aerial vehicle for operation. Non-limiting examples of flight sensor data include flight detail data, onboard sensor data, data received from other vehicles, and stored data.

"Landing zone" refers to a portion of an environment where an aerial vehicle is to land or from which an aerial vehicle is taking off.

"Operational mode" refers to a current state of operation for an aerial vehicle.

"Profile view" refers to a depicted view of an object onset from a perspective along a horizontal axis of the object. In some embodiments, a profile view is depicted utilizing orthographic projection.

"Representation" refers to a visual depiction within a user interface of data or an object. In some embodiments, a representation is defined by an interface element that depicts the representation within the user interface.

"Side profile" refers to a depiction of a three-dimensional object from one side of the object. With respect to an aerial vehicle having a forward-facing side, a back-facing side, a left-facing side, and a right-facing side, for example, a side profile of the aerial vehicle depicts the aerial vehicle from any one of said sides.

"UAM" refers to urban air mobility, which includes all aerial vehicles and functions for aerial vehicles that are capable of performing vertical takeoff and/or vertical landing procedures within an urban area. Non-limiting examples of UAM aerial vehicles include passenger transport vehicles, cargo transport vehicles, small package delivery vehicles, unmanned aerial system services, autonomous drone vehicles, and ground-piloted done vehicles, where any such vehicle is capable of performing vertical takeoff and/or vertical landing.

"UAM visualization interface" refers to one or more interface elements that depicts a representation of a virtual environment including a virtual vehicle corresponding to an aerial vehicle. Non-limiting examples of a UAM visualization interface includes an interface element depicting a profile view, an egocentric view, and an exocentric view of a virtual environment.

"User interface" refers to any visual data rendered to or configured to be renderable to a display.

"Virtual corridor" refers to a virtual object of a virtual environment that defines a volume above a landing zone, where the volume is safe for operation of an aerial vehicle. In some embodiments, a virtual corridor embodies a cylindrical cone shape extending from a virtual object representing a landing zone.

"Virtual vehicle" refers to a virtual object representing an aerial vehicle within a virtual environment.

"Volume" refers to a three-dimensional portion of an environment.

Example Systems and Apparatuses of the Disclosure

FIG. 1 illustrates a system for enabling aerial vehicle control in accordance with at least some embodiments of the present disclosure. Specifically, FIG. 1 depicts an example system 100 within which embodiments of the present disclosure may operate to provide improved UAM visualization interface(s) as described herein. As depicted, the system 100 includes an aerial vehicle onboard system(s) 102, for example which embodies one or more system(s) of an aerial vehicle 150 operating within a particular environment. In some embodiments, the aerial vehicle onboard system(s) 102 is optionally communicable with one or more other computing device(s) and/or system, such as other connected vehicle system(s) 104, flight management system(s) 106, and environment data system(s) 108. In some embodiments, the aerial vehicle onboard system(s) 102 is communicable with one or more of the other computing device(s) and/or system(s) over one or more communications network(s), such as the communications network 110.

In some embodiments, the aerial vehicle onboard system(s) 102 includes any number of computing device(s) and/or system(s) embodied in hardware, software, firmware, and/or a combination thereof that control, operate, and/or are onboard an aerial vehicle 150. For example, in some embodiments, the aerial vehicle onboard system(s) 102 includes one or more physical component(s) of the aerial vehicle 150, including and without limitation one or more display(s), flight management system(s), engine(s), wing(s), prop(s), motor(s), antenna(s), landing gear(s), and/or the like. In some embodiments, the aerial vehicle onboard system(s) 102 includes one or more sensor(s) that gather, collect, and/or otherwise aggregate flight sensor data associated with an aerial vehicle 150 and/or an environment associated therewith. Additionally or alternatively, in some embodiments, the aerial vehicle onboard system(s) 102 includes one or more computing device(s) and/or system(s) embodied in hardware, software, firmware, and/or a combination thereof, that control(s) operation of one or more physical component(s) of the aerial vehicle 150, including and without limitation one or more display(s), flight management system(s), engine(s), wing(s), prop(s), motor(s), antenna(s), landing gear(s), sensor(s), and/or the like. Additionally or alternatively, in some embodiments, the aerial vehicle onboard system(s) 102 includes one or more computing device(s) and/or system(s) embodied in hardware, software, firmware, and/or any combination thereof, that generates one or more user interface(s) renderable to one or more display(s) of the aerial vehicle onboard system(s) 102. Additionally or alternatively, in some embodiments, the aerial vehicle onboard system(s) 102 includes one or more computing device(s) and/or system(s) embodied in hardware, software, firmware, and/or any combination thereof, that generates and/or maintains data embodying and/or utilized to recreate a virtual environment including virtual aspect(s) of a corresponding to and/or associated with a real-world environment and/or a virtual vehicle corresponding to the actual vehicle. It will be appreciated that the aerial vehicle 150 may include any number of physical component(s) that enable the aerial vehicle 150 to operate in a particular manner of airborne travel.

In some embodiments, the aerial vehicle onboard system(s) 102 includes one or more personal computer(s), end-user terminal(s), monitor(s) or other display(s), and/or the like. Additionally or alternatively, in some embodiments, the aerial vehicle onboard system(s) 102 includes one or more data repository/repositories embodied in hardware, software, firmware, and/or any combination thereof to support functionality provided by one or more computing device(s) of the aerial vehicle onboard system(s) 102. In some embodiments the aerial vehicle onboard system(s) 102 includes one or more specially configured integrated system(s) that process data received by and/or control one or more other computing device(s) and/or system(s) of the aerial vehicle onboard system(s) 102.

The other connected vehicle system(s) 104 include computing device(s), system(s), and/or onboard system(s) of other vehicle(s) communicatively coupled with the aerial vehicle associated with aerial vehicle onboard system(s) 102. It will be appreciated that the other connected vehicle system(s) 104 in some embodiments includes computing device(s) and/or system(s) of one or more other aerial vehicle(s) of the same-type operating within the same environment as the aerial vehicle associated with aerial vehicle onboard system(s) 102. For example, in some embodiments some of the other connected vehicle system(s) 104 include computing device(s) and/or system(s) of other aerial vehicle(s) in a fleet of a particular type of aerial vehicle. Additionally or alternatively, in some embodiments, the other connected vehicle system(s) 104 includes computing device(s) and/or system(s) of ground vehicle(s), other types of aerial vehicle(s), and/or the like.

In some embodiments, the aerial vehicle onboard system(s) 102 receives data from one or more of the other connected vehicle system(s) 104 that provides additional context with respect to the environment in which the aerial vehicle associated with aerial vehicle onboard system(s) 102 is operating. For example, in some embodiments, the aerial vehicle onboard system(s) 102 communicates with the other connected vehicle system(s) 104 to determine a position of other aerial vehicle(s), object(s), environmental feature(s) (e.g., buildings, terrain, and/or the like) within the environment of the aerial vehicle associated with aerial vehicle onboard system(s) 102, and/or the like. Additionally or alternatively, in some embodiments, the aerial vehicle onboard system(s) 102 communicate with one or more of the other connected vehicle system(s) 104 to receive flight sensor data of a particular data type that is not capturable directly by the aerial vehicle onboard system(s) 102. For example, in some embodiments, the aerial vehicle associated with the aerial vehicle onboard system(s) 102 does not include a particular sensor for capturing a particular type of data, and instead receives such data of the particular data type from the other connected vehicle system(s) 104.

In some embodiments, the flight management system(s) 106 includes one or more computing device(s) embodied in hardware, software, firmware, and/or the like that generate, assign, and/or maintain flight plan information and/or other flight detail data for one or more aerial vehicle(s). For example, in some embodiments, the flight management system(s) 106 include computing device(s) and/or system(s) of an air traffic control system and/or other authoritative entity that assigns flight detail data (e.g., particular flight plan(s) and/or information associated therewith) to one or more aerial vehicle(s). Such information may include, without limitation, flight detail data embodying a VFR flight plan, an IFR flight plan, a composite flight plan, and/or the like defining conditions for operating an aerial vehicle within a particular environment.

In some embodiments, the flight management system(s) 106 includes one or more application server(s), end user terminal(s), personal computer(s), mobile device(s), user device(s), and/or the like that generate, assign, and/or transmit flight detail data to aerial vehicle(s). Additionally or alternatively, in some embodiments, the flight management system(s) 106 includes one or more includes one or more data repository/repositories embodied in hardware, software, firmware, and/or a combination thereof, that stores flight detail data, links between flight detail data and particular aerial vehicle(s), and/or the like. Additionally or alternatively, in some embodiments, the flight management system(s) 106 includes one or more computing device(s) and/or system(s) that detect and/or monitor operation of one or more aerial vehicle(s) within an environment. For example, in some embodiments, the flight management system(s) 106 includes one or more radar system(s) hat monitor the position of aerial vehicle(s) within a particular portion of an environment.

The environment data system(s) 108 includes one or more computing device(s) and/or system(s) that includes data representing one or more aspect(s) of a real-world environment, object(s) therein, and/or aerial vehicle(s) therein. In some embodiments, the environment data system(s) 108 includes one or more data repository/repositories that store data embodying terrain of a particular environment. Additionally or alternatively, in some embodiments, the environment data system(s) 108 includes one or more data repository/repositories that store data embodying building(s), object(s), and/or other features within the environment that aerial vehicle(s) in the environment are to avoid or interact with (e.g., for takeoff and/or landing). In some embodiments, the environment data system(s) 108 embodies a subsystem of the flight management system(s) 106 and/or other connected vehicle system(s) 104. For example, in some embodiments, the environment data system(s) includes a cityscape obstacle database, a vertiport database (e.g., including locations, dimensions, and/or other characteristic of landing zone(s)), and/or the like.

In some embodiments, the environment data system(s) 108 includes one or more application server(s), end user terminal(s), personal computer(s), mobile device(s), user device(s), and/or the like. Additionally or alternatively, in some embodiments, the environment data system(s) 108 includes one or more database server(s) specially configured to store data pushed from one or more other computing device(s) and/or system(s) (e.g., the aerial vehicle onboard system(s) 102, other connected vehicle system(s) 104, flight management system(s) 106, and/or the like) and/or retrieve data in response to one or more queries from one or more other computing device(s) and/or system(s). In some embodiments, the environment data system(s) 108 includes one or more remote and/or cloud computing device(s) accessible to the aerial vehicle onboard system(s) 102, other connected vehicle system(s) 104, and/or flight management system(s) 106 over a communications network, such as the communications network 110.

In some embodiments the communications network 110 enables communication between the various computing device(s) and/or system(s) utilizing one or more combination(s) of wireless and/or wired data transmission(s) and protocol(s). In this regard, the communications network 110 may embody any of a myriad of network configurations. In some embodiments, the communications network 110 embodies a public network (e.g., the Internet) in whole or in part. In some embodiments, the communications network 110 embodies a private network (e.g., an internal network between particular computing devices) in whole or in part. Alternatively or additionally, in some embodiments the communications network 110 embodies a direct or private connection facilitated over satellite or radio system(s) that enables long-range communication between aerial vehicle(s) and corresponding grounded system(s). In some other embodiments, the communications network 110 embodies a hybrid network (e.g., a network enabling internal communications between particular connected computing devices and external communications with other computing devices). The communications network 110 may include one or more base station(s), relay(s), router(s), switch(es), cell tower(s), communications cable(s), satellite(s), radio antenna(s) and/or related control system(s), and/or associated routing station(s), and/or the like. In some embodiments, the communications network 110 includes one or more user entity-controlled computing device(s) and/or other enterprise device(s) (e.g., an end-user's or enterprise router, modem, switch, and/or other network access point) and/or one or more external utility devices (e.g., Internet service provider communication tower(s), cell tower(s), and/or other device(s)). In some embodiments, the aerial vehicle onboard system(s) 102 communicates with one or more of the other connected vehicle system(s) 104, flight management system(s) 106, environment data system(s) 108 over the communications network 110 to receive and/or transmit the data described herein for generating the user interface(s) for providing to one or more display(s) of an aerial vehicle.

Figure 2:
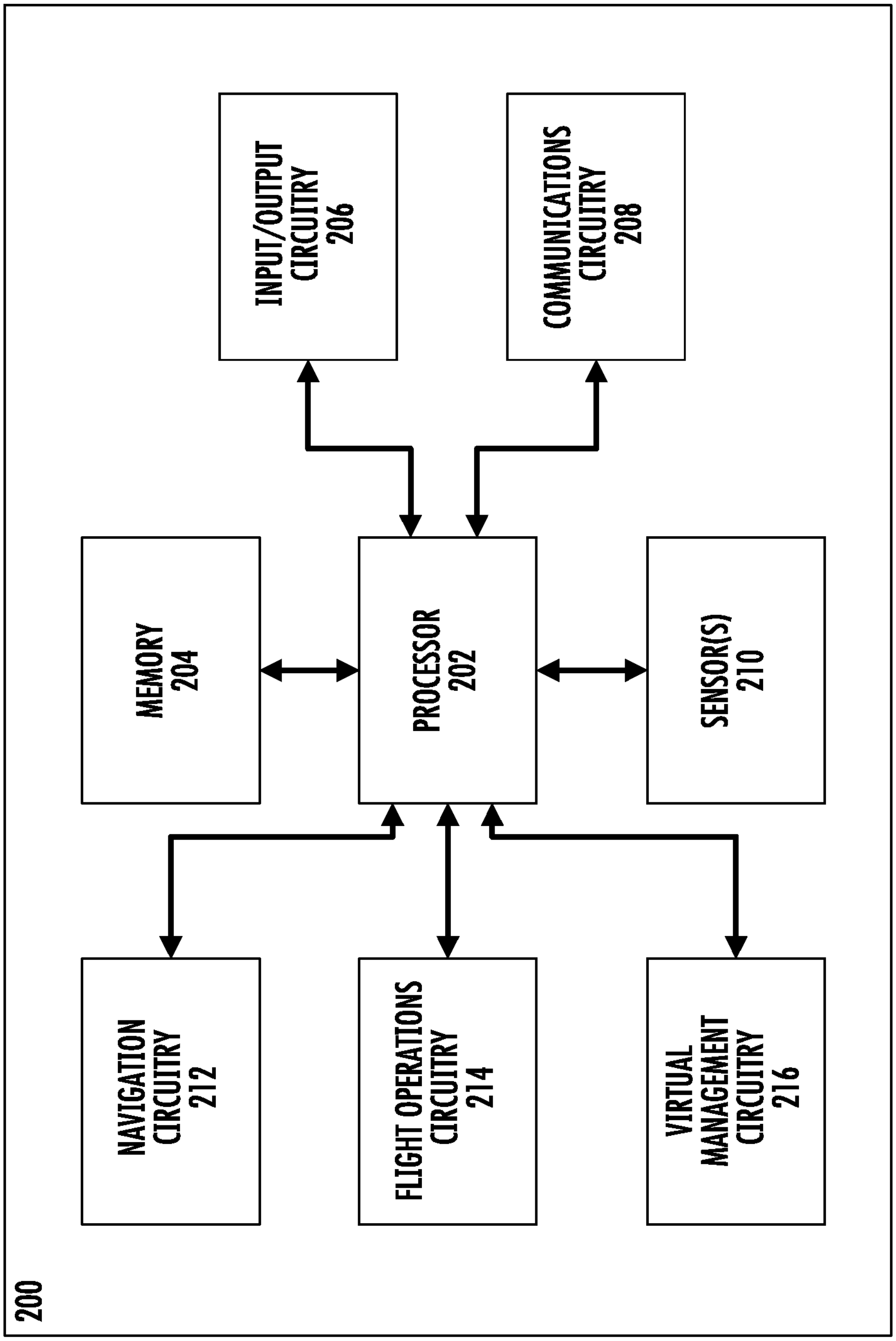
FIG. 2 illustrates a block diagram of an example improved aerial operation visualization apparatus in accordance with at least some embodiments of the present disclosure.

FIG. 2 illustrates a block diagram of an example improved aerial operation visualization apparatus in accordance with at least some embodiments of the present disclosure. Specifically, FIG. 2 depicts an improved aerial operation visualization apparatus 200. In some embodiments, one or more computing device(s) and/or system(s) of an aerial vehicle, for example included in or embodied by the aerial vehicle onboard system(s) 102, is embodied by one or more computing devices such as the improved aerial operation visualization apparatus 200 as depicted and described in FIG. 2. As depicted, the improved aerial operation visualization apparatus 200 includes a processor 202, a memory 204, input/output circuitry 206, communications circuitry 208, sensor(s) 210, navigation circuitry 212, flight operations circuitry 214, and/or virtual management circuitry 216. In some such embodiments, the navigation circuitry 212 and/or the flight operations circuitry 214 is/are optional. In some embodiments, the improved aerial operation visualization apparatus 200 is configured, using one or more of the sets of circuitry embodying processor 202, memory 204, input/output circuitry 206, communications circuitry 208, sensor(s) 210, navigation circuitry 212, flight operations circuitry 214, and/or virtual management circuitry 216, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the improved aerial operation visualization apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the improved aerial operation visualization apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the improved aerial operation visualization apparatus 200 to carry out various functions in accordance with example embodiments of the present disclosure.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the improved aerial operation visualization apparatus 200, and/or one or more remote or "cloud" processor(s) external to the improved aerial operation visualization apparatus 200.

In an example embodiment, the processor 202 is configured to execute instructions stored in the memory 204 or otherwise accessible to the processor 202. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with generating improved UAM visualization interface(s) and/or user interface(s) associated therewith, for example as described with respect to aerial vehicle onboard system(s) 102 and/or described further herein. In some embodiments, the processor 202 includes hardware, software, firmware, and/or a combination thereof, that generates a virtual corridor in a virtual environment corresponding to a real-world environment associated with a particular aerial vehicle. Additionally or alternatively, in some embodiments, the processor 202 includes hardware, software, firmware, and/or a combination thereof, that generates one or more UAM visualization interface(s) based at least in part on a virtual corridor of a virtual environment and/or a virtual vehicle corresponding to an aerial vehicle. Additionally or alternatively, in some embodiments, the processor 202 includes hardware, software, firmware, and/or a combination thereof, that captures and/or aggregates flight sensor data for use in generating and/or maintaining one or more aspect(s) of a virtual environment, for example a virtual corridor, a virtual vehicle within the virtual environment, virtual terrain and/or virtual object(s) corresponding to terrain and/or object(s) in the associated real-world environment, and/or the like. Additionally or alternatively, in some embodiments, the processor 202 includes hardware, software, firmware, and/or a combination thereof, that output(s) one or more UAM visualization interface(s).

In some embodiments, improved aerial operation visualization apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user.

The communications circuitry 208 includes any means such as a device or circuitry embodied in either hardware or a combination of hardware and software that is configured to receive and/or transmit data from/to a communications network and/or any other computing device, circuitry, or module in communication with the improved aerial operation visualization apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from one or more computing device(s) and/or system(s) of other connected vehicle system(s) 104, flight management system(s) 106, and/or environment data system(s) 108, in communication with the improved aerial operation visualization apparatus 200.

The sensor(s) 210 includes hardware, software, firmware, and/or a combination thereof, that supports generation, capturing, aggregating, retrieval, and/or receiving of one or more portions of flight sensor data. In some embodiments, the sensor(s) 210 includes one or more discrete component(s) of an aerial vehicle. The sensor(s) 210 in some embodiments are affixed to, within, and/or otherwise as a part of an aerial vehicle including or otherwise associated with the improved aerial operation visualization apparatus 200. For example, in some embodiments, one or more of the sensor(s) 210 is/are mounted to the aerial vehicle. Non-limiting examples of sensor(s) 210 include altimeter(s) (e.g., radio and/or barometric), pressure sensor(s), pilot tube(s), anemometer(s), image camera(s), video camera(s), infrared sensor(s), and/or the like. Additionally or alternatively, in some embodiments, the sensor(s) 210 include communication system(s) that enable aggregation of one or more portion(s) of flight sensor data from one or more external computing device(s) and/or system(s) communicable with the improved aerial operation visualization apparatus 200, for example other connected vehicle system(s) 104, flight management system(s) 106, and/or environment data system(s) 108. In some embodiments, the sensor(s) 210 any of a myriad of sensor(s) conventionally associated with drone(s), helicopter(s), and/or other urban air mobility aerial vehicles. Additionally or alternatively, in some embodiments, the sensor(s) 210 include one or more high-sensitivity sensor(s) to facilitate enable high accuracy capturing of data in certain circumstances. For example, in some embodiments, the sensor(s) 210 includes one or more high-sensitivity altimeter(s) that capture detailed altitude information within a few feet (e.g., within tens of feet) from a landing zone. In this regard, such high-sensitivity sensor(s) in some embodiments provide higher-accuracy data when an aerial vehicle is close to a landing zone, where such higher-accuracy data is utilized in depicting accurate positioning of a virtual vehicle corresponding to the aerial vehicle within a virtual environment with respect to a virtual representation of the landing zone and/or a virtual corridor.

In some embodiments, the sensor(s) 210 includes hardware, software, firmware, and/or a combination thereof, embodying one or more navigation sensor(s). In some embodiments, the navigation sensor(s) includes a global positioning satellite (GPS) tracking chip and/or the like enabling location services to be requested and/or determined for a particular aerial vehicle. Additionally or alternatively, in some embodiments, the sensor(s) 210 includes hardware, software, firmware, and/or any combination thereof, embodying inertial navigation sensor(s) that measures speed, acceleration, orientation, and/or position-related data in a 3D environment. Additionally or alternatively, in some embodiments, the sensor(s) 210 includes one or more camera(s) associated with a synthetic vision system (SVS). In some such embodiments, such an SVS camera captures image data representation(s) of the real-world environment around an aerial vehicle for use in generating corresponding user interface(s) depicting he captured image data, augmenting such image data, and/or otherwise providing data to enable an operator to acquire situational awareness based at least in part on the captured image data. It will be appreciated that, in some embodiments, the sensor(s) 210 includes a separate processor, specially configured field programmable gate array (FPGA), or a specially programmed application specific integrated circuit (ASIC).

The optional navigation circuitry 212 includes hardware, software, firmware, and/or a combination thereof, that supports various functionality associated with navigating an aerial vehicle. In some embodiments, navigation circuitry 212 includes hardware, software, firmware, and/or a combination thereof, that receives flight plan data, location service(s) data representing a location of the aerial vehicle, and/or the like. Additionally or alternatively, in some embodiments, the navigation circuitry 212 includes hardware, software, firmware, and/or a combination thereof, that determines a location of a landing zone from which an aerial vehicle is taking off and/or where an aerial vehicle is landing. Alternatively or additionally, in some embodiments, the navigation circuitry 212 includes hardware, software, firmware, and/or a combination thereof, that determines a location along a flight path at which an aerial vehicle is to switch operational mode (e.g., to initiate change to and/or from a vertical landing mode and/or vertical takeoff mode). It will be appreciated that, in some embodiments, navigation circuitry 212 includes a separate processor, specially configured field programmable gate array (FPGA), or a specially programmed application specific integrated circuit (ASIC).

The optional flight operations circuitry 214 includes hardware, software, firmware, and/or a combination thereof, that supports various functionality associated with controlling an aerial vehicle. In some embodiments, the flight operations circuitry 214 includes hardware, software, firmware, and/or a combination thereof, that autonomously control(s) one or more component(s) of an aerial vehicle to facilitate movement of the aerial vehicle along a particular flight path. Alternatively or additionally, in some embodiments, the flight operations circuitry 214 includes hardware, software, firmware, and/or a combination thereof, that semi-autonomously control(s) one or more component(s) of an aerial vehicle, for example where certain aspects of the operation of the aerial vehicle are autonomously performed and others (e.g., directional control) is/are controlled by a user (e.g., a pilot). Alternatively or additionally, in some embodiments, the flight operations circuitry 214 includes hardware, software, firmware, and/or a combination thereof, that receives pilot input for controlling one or more component(s) of an aerial vehicle, for example via vehicle flight control(s) to alter speed and/or direction of the aerial vehicle. Alternatively or additionally, in some embodiments, the flight operations circuitry 214 includes hardware, software, firmware, and/or a combination thereof, that causes changes to an operational mode of an aerial vehicle, for example autonomously based at least in part on one or more data-driven event(s) and/or triggers, or in response to user input initiating the change in operational mode. It will be appreciated that, in some embodiments, the flight operations circuitry 214 includes a separate processor, specially configured field programmable gate array (FPGA), or a specially programmed application specific integrated circuit (ASIC).

The virtual management circuitry 216 includes hardware, software, firmware, and/or a combination thereof, that supports various functionality associated with generating and/or maintaining virtual element(s) and/or outputting UAM visualization interface(s) embodying view(s) of one or more virtual element(s). In some embodiments, the virtual management circuitry 216 includes hardware, software, firmware, and/or a combination thereof, that generates a virtual environment based at least in part on flight sensor data. Additionally or alternatively, in some embodiments, the virtual management circuitry 216 includes hardware, software, firmware, and/or a combination thereof, that generates a virtual vehicle based at least in part on flight sensor data, the virtual vehicle corresponding to an aerial vehicle in a real-world environment. Additionally or alternatively, in some embodiments, the virtual management circuitry 216 includes hardware, software, firmware, and/or a combination thereof, that generates a virtual corridor based at least in part on flight sensor data. Additionally or alternatively, in some embodiments, the virtual management circuitry 216 includes hardware, software, firmware, and/or a combination thereof, that maintains one or more virtual element(s) (e.g., a virtual environment, a virtual vehicle, a virtual corridor, and/or the like) as new data is received. For example, in some embodiments, the virtual management circuitry 216 updates a speed, direction, velocity, altitude, and/or other data value associated with a virtual vehicle in a virtual environment as updated flight sensor data associated with a corresponding aerial vehicle is received. Additionally or alternatively, in some embodiments, the virtual management circuitry 216 includes hardware, software, firmware, and/or a combination thereof, that outputs data embodying a UAM visualization interface from a particular view with respect to the virtual vehicle, for example a profile view, an exocentric view, and/or an egocentric view.

In some embodiments, the virtual management circuitry 216 includes hardware, software, firmware, and/or any combination thereof, that generates user interface element(s) and/or otherwise causes rendering of user interface(s) including specially configured user interface element(s). For example, in some embodiments, the virtual management circuitry 216 includes hardware, software, firmware, and/or a combination thereof that generates one or more virtual element(s) to be depicted via a UAM visualization interface(s). For example, in some embodiments, the virtual management circuitry 216 generates a UAM visualization interface depicting a virtual corridor, with or without reliance on maintaining a virtual environment. In some embodiments, the virtual management circuitry 216 includes a graphics processor that generates one or more specially configured virtual user interface element(s) (e.g., a representation of a virtual corridor) based at least in part on flight sensor data, and/or generating sub-interfaces including some or all of such virtual user interface element(s) and/or other interface element(s). Additionally or alternatively, in some embodiments, the virtual management circuitry 216 includes one or more display(s) embodied in hardware, software, firmware, and/or a combination thereof, that render user interface(s) and/or element(s) thereof. It will be appreciated that, in some embodiments, virtual management circuitry 216 includes a separate processor, specially configured field programmable gate array (FPGA), or a specially programmed application specific integrated circuit (ASIC).

It will be appreciated that, further in some embodiments, two or more of the sets of circuitries 202-216 are combinable. Alternatively or additionally, in some embodiments, one or more of the sets of circuitry 202-216 perform some or all of the functionality described associated with another component. For example, in some embodiments, one or more of the sets of circuitry 202-216 are combined into a single component embodied in hardware, software, firmware, and/or a combination thereof. For example, in some embodiments, two or more of the navigation circuitry 212, flight operations circuitry 214, and/or virtual management circuitry 216 are embodied by a single set of circuitry that performs the combined operations of the individual sets of circuitry. Similarly, in some embodiments, one or more of the sets of circuitry, for example navigation circuitry 212, flight operations circuitry 214, and/or virtual management circuitry 216, is/are combined with the processor 202, such that the processor 202 performs one or more of the operations described above with respect to each of these other sets of circuitry.

Figure 3:
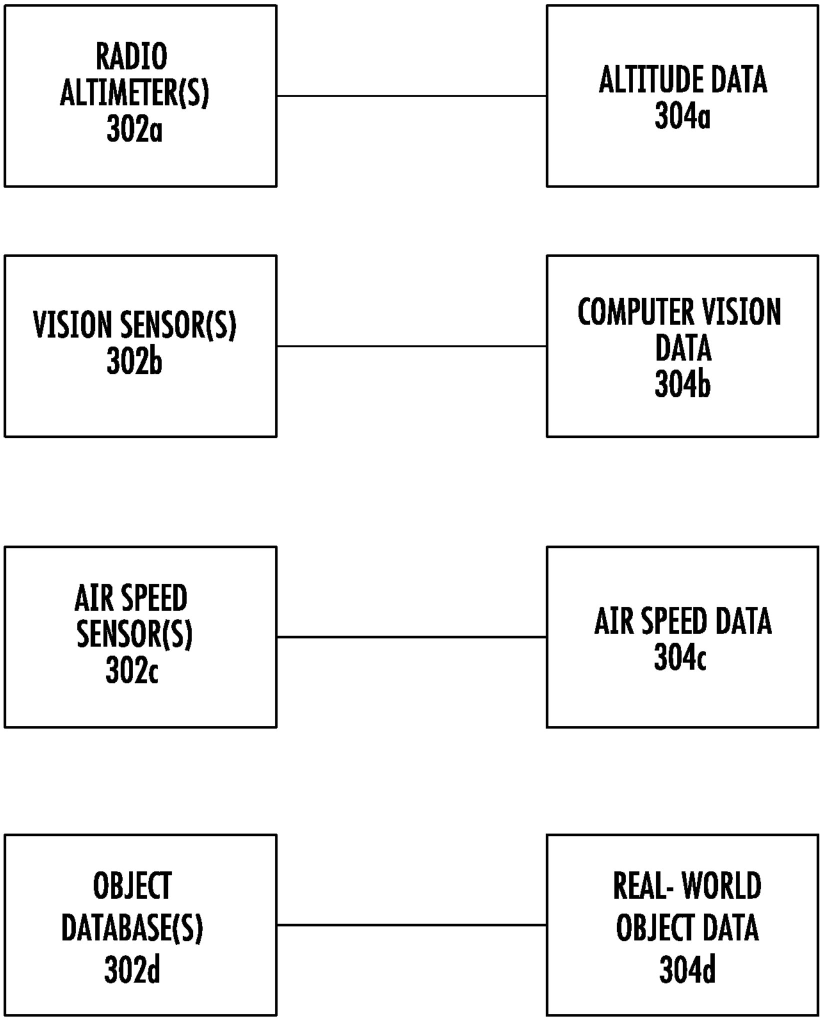
FIG. 3 illustrates example data types processed for generating improved user interfaces for aerial vehicles in accordance with at least some example embodiments of the present disclosure.

FIG. 3 illustrates example data types processed for generating improved user interfaces for aerial vehicles in accordance with at least some example embodiments of the present disclosure. Specifically, FIG. 3 illustrates a plurality of data types captured and/or aggregated by one or more sensor(s) of an aerial vehicle, each data type embodying a non-limiting example portion of flight sensor data processed for generating improved user interface(s) in accordance with at least some example embodiments of the present disclosure. It will be appreciated that the particular types of data are exemplary and for non-limiting descriptive purposes only, and should not limit the scope or spirit of this disclosure.

As illustrated, in some embodiments, an aerial vehicle (such as the aerial vehicle 150 including or embodied by the improved aerial operation visualization apparatus 200) includes and/or utilizes a radio altimeter(s) 302*a* that captures and/or otherwise aggregates altitude data 304*a*. In this regard, the radio altimeter(s) 302*a* may update the altitude data 304*a* corresponding to the aerial vehicle in real-time, such that the altitude data 304*a* represents an updated altitude as the aerial vehicle moves throughout an environment. In some embodiments, the improved aerial operation visualization apparatus 200 receives the altitude data 304*a* via the radio altimeter(s) 302*a* and stores the altitude data 304*a* as a current altitude value. Additionally or alternatively, in some embodiments, the improved aerial operation visualization apparatus 200 utilizes the altitude data 304*a* to alter a virtual vehicle within a virtual environment, for example by depicting the virtual vehicle to the particular altitude represented by altitude data 304*a* within the virtual environment.

Additionally or alternatively, in some embodiments, an aerial vehicle includes and/or utilizes vision sensor(s) 302*b* that captures and/or aggregates computer vision data 304*b*. In some embodiments, the computer vision data 304*b* includes image data and/or video data captured by one or more camera(s) of an aerial vehicle (e.g., mounted on the exterior of the aerial vehicle). In some such embodiments, the computer vision data 304*b* embodies data visually depicting one or more aspect(s) of the environment around the aerial vehicle. In some embodiments, the computer vision data 304*b* is utilized to generate one or more user interface(s) depicting portion(s) of the environment. For example, in some embodiments, the improved aerial operation visualization apparatus 200 outputs and/or otherwise causes rendering of user interface(s) that depict portion(s) of an environment that would otherwise be outside the visible area available to a pilot (e.g., directly underneath and/or directly above the aerial vehicle). In some embodiments, the improved aerial operation visualization apparatus 200 receives the computer vision data 304*b* to configure one or more virtual element(s) in a virtual environment. For example, in some embodiments, the improved aerial operation visualization apparatus 200 utilizes computer vision data 304*b* to detect object(s) in an environment around an aerial vehicle and map such object(s to virtual object(s) to be depicted in a corresponding virtual environment.

Additionally or alternatively, in some embodiments, an aerial vehicle includes and/or utilizes air speed sensor(s) 302*c* that captures and/or aggregates air speed data 304*c*. In some embodiments, the air speed data 304*c* indicates a data value representing the current and/or historical speed and/or velocity of the aerial vehicle. In some embodiments, the air speed sensor(s) 302*c* outputs updated air speed data 304*c* as the air speed of the aerial vehicle changes. In some embodiments, the improved aerial operation visualization apparatus 200 receives the air speed data 304*c* via the air speed sensor(s) 302*c* and stores the data as a current speed for the aerial vehicle. Additionally or alternatively, in some embodiments, the improved aerial operation visualization apparatus 200 utilizes the air speed data 304*c* to alter a virtual vehicle within a virtual environment, for example by updating the position of the virtual vehicle in the virtual environment based at least in part on the air speed represented by the air speed data 304*c*.

In some embodiments, the aerial vehicle includes or communicates with object database(s) 302*d*. In some embodiments, the object database(s) 302*d* includes one or more database(s) that store data representing and/or associated with characteristic(s) of object(s) within a real-world environment. For example, in some embodiments, the object database(s) 302*d* includes a database that stores data indicating position, size, and/or other characteristics of structural object(s) within a real-world environment (e.g., a Cityscape database). Additionally or alternatively, in some embodiments, the object database(s) 302*d* includes a database that stores data indicating position, size, and/or other characteristics of landing zone(s) within a real-world environment (e.g., a vertiport database). In this regard, the data stored to one or more of the object database(s) 302*d* corresponding to the real-world objects may be utilized to configure and/or depict one or more virtual elements associated therewith. In some embodiments, the object database(s) 302*d* are stored onboard an aerial vehicle, for example maintained by the an improved aerial operation visualization apparatus 200.

In some embodiments, the object database(s) 302*d* store real-world object data 304*d*. In some embodiments, the real-world object data 304*d* indicates data value(s) for characteristic(s) and/or data parameter(s) associated with real-world object(s) in an environment. Such data value(s) in some embodiments indicate position, size, and/or other physical aspects of such object(s) usable by the improved aerial operation visualization apparatus 200 to generate corresponding virtual representation(s) of such object(s) and/or virtual element(s) associated therewith. For example, in some embodiments, the improved aerial operation visualization apparatus 200 obtains real-world object data 304*d* to generate a virtual corridor that extends from a particular landing zone at a particular location and of a particular size. In one example context, the real-world object data 304*d* defines a radius of a landing zone, such that a virtual corridor may be generated having the same size radius at the lowest end (e.g., where the virtual corridor meets the landing zone).

In this regard, it will be appreciated that, in some embodiments, the aerial vehicle may capture and/or aggregate various portion(s) of data utilized to generate and/or maintain one or more virtual element(s) associated with a virtual environment. In other embodiments, additional type(s) of flight sensor data is/are captured and/or aggregated for use in configuring a virtual environment. For example, in some embodiments, flight path data is captured and/or aggregated and utilized to generate and/or depict one or more flight marker(s) within a virtual environment, a virtual corridor within the virtual environment, and/or the like. Additionally or alternatively, it will be appreciated that various portions of flight sensor data may be utilized in a myriad of ways. For example, in some embodiments, computer vision data 304*b* is utilized to generate terrain, object(s), and/or structures in a virtual environment, whereas in other embodiments the computer vision data 304*b* is utilized to identify a landing zone for use in generating a corresponding virtual corridor. In this regard, in some embodiments, any data captured and/or received by the improved aerial operation visualization apparatus 200 embodying or included in an aerial vehicle may be processed to generate and/or maintain one or more virtual element(s) and/or to generate one or more user interface(s) including one or more virtual element(s).

Example Interfaces of the Disclosure

Having described example systems, apparatuses, and flight sensor data properties, example user interfaces and specially configured interface elements thereof in accordance with the present disclosure will now be discussed. In some embodiments, a user interface is rendered via one display, for example a primary flight display of an aerial vehicle. In some embodiments, a user interface and/or particular interface element(s) thereof is/are rendered to different display(s) of an aerial vehicle. Any sub-interface or portion of data within a user interface may be referred to as an "interface element."

In some embodiments, the improved aerial operation visualization apparatus 200 generates and/or maintains a virtual environment including any number of virtual element(s) associated with operation of the aerial vehicle. In some such embodiments, the virtual environment accurately represents each corresponding aspect of a real-world environment. For example, in some embodiments, the improved aerial operation visualization apparatus 200 utilizes flight sensor data, previously stored data, and/or the like to generate and/or maintain virtual terrain, virtual object(s), and/or virtual structure(s) in a virtual environment corresponding to real-world terrain, real-world object(s), and/or real-world structure(s). In this regard, the virtual terrain, virtual object(s), and/or virtual structure(s) are accurately positioned such that the virtual environment mirrors the corresponding real-world environment. Additionally or alternatively, in some embodiments the improved aerial operation visualization apparatus 200 utilizes such flight sensor data, previously stored data, and/or the like to generate and/or maintain a virtual vehicle corresponding to an aerial vehicle within a real-world environment. In some embodiments, the virtual vehicle is generated with particular dimension(s) equaling or approximating (e.g., with one or more bounding bodies) the actual dimensions of a particular aerial vehicle. Additionally or alternatively, in some embodiments, the virtual vehicle is positioned in the virtual environment at a particular position that accurately corresponds to the position of the actual vehicle in the real-world environment with respect to one or more other object(s) and/or element(s) in said real-world environment. For example, in some embodiments, the improved aerial operation visualization apparatus 200 updates a position of a virtual vehicle in real-time as the corresponding actual aerial vehicle maneuvers throughout a real-world environment, for example by updating altitude, speed, direction, location, and/or other position data associated with the virtual vehicle.

In some such embodiments, the improved aerial operation visualization apparatus 200 utilizes a maintained virtual environment to generate one or more UAM visualization interface(s), each representing a particular view of the virtual environment. For example, in some embodiments, the improved aerial operation visualization apparatus 200 generates a particular UAM visualization interface representing a particular viewport from the perspective of a virtual camera positioned within the virtual environment. It will be appreciated that one or more virtual camera(s) may be positioned at any location in the virtual environment. For example, in some embodiments, the improved aerial operation visualization apparatus 200 positions a first virtual camera having a perspective from within and/or along the exterior of a virtual vehicle that is otherwise blocked to a pilot in a corresponding real-world environment, a second virtual camera having an exocentric perspective beginning at a particular offset from location of the virtual vehicle, and/or a third camera having a perspective of a profile of the virtual vehicle. It will be appreciated that any number of virtual camera(s) may be generated and/or maintained, and each virtual camera may be configured similarly or with different configuration settings based at least in part on received data, user input (e.g., configuring a particular virtual camera and/or requesting a particular view), predetermined configuration setting(s), and/or the like. For example, in some embodiments, a virtual camera associated with a profile view is configured to utilize orthographic projection (e.g., an orthographic side view), whereas virtual camera(s) associated with an egocentric view and/or an exocentric view is/are configured to utilize perspective projection. In some such embodiments, the profile view represents a 2D orthographic projection from a viewport offset from a position of the aerial vehicle and/or associated therewith (e.g., from a point along the exterior of the aerial vehicle).

In other embodiments, the improved aerial operation visualization apparatus 200 does not maintain a continuous virtual environment. In some embodiments, the improved aerial operation visualization apparatus 200 regenerates and/or represents portion(s) of a virtual environment based at least in part on received flight sensor data as it is received. For example, in some embodiments, the improved aerial operation visualization apparatus 200 determines an altitude distance between an aerial vehicle and one or more portions of a real-world environment (e.g., a landing zone). In some such embodiments, the improved aerial operation visualization apparatus 200 utilizes the altitude distance (and/or other calculated data) to generate a representation of a virtual environment as such representation(s) are to be rendered.

Figure 4:
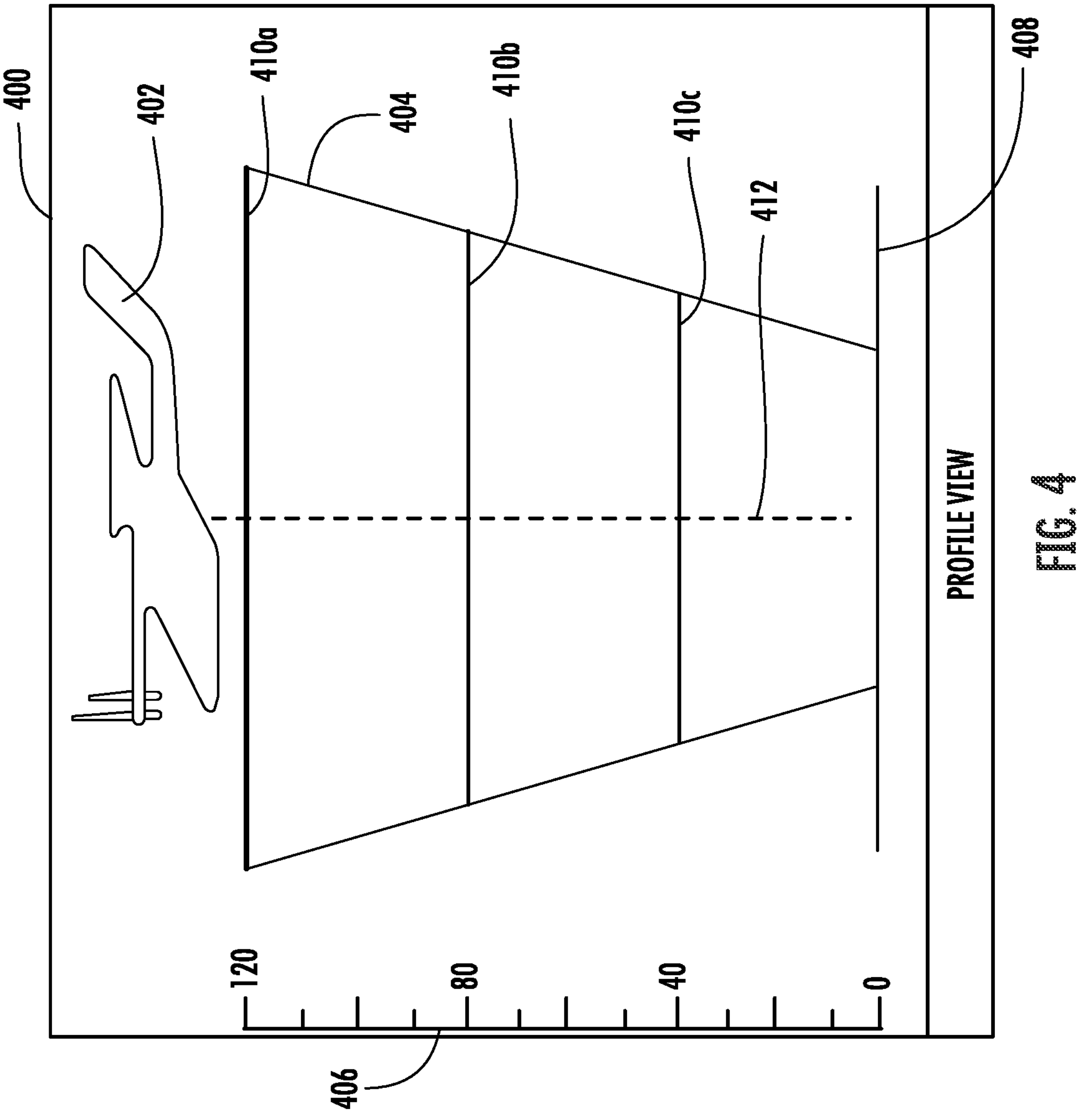
FIG. 4 illustrates an example profile view embodying an example UAM visualization interface in accordance with at least some example embodiments of the present disclosure.

FIG. 4 illustrates an example profile view embodying an example UAM visualization interface in accordance with at least some example embodiments of the present disclosure. Specifically, FIG. 4 depicts an example profile view UAM visualization interface 400. In some embodiments, the example profile view is output as a user interface to be rendered to one or more display(s) of an aerial vehicle, for example embodied by and/or including the improved aerial operation visualization apparatus 200. Alternatively or additionally, in some embodiments, the improved aerial operation visualization apparatus 200 generates and/or outputs a user interface that includes the profile view UAM visualization interface 400 as a sub-interface. For example, in some embodiments, the improved aerial operation visualization apparatus 200 causes rendering to one or more display(s) of a user interface including a plurality of UAM visualization interfaces.

The profile view UAM visualization interface 400 depicts a particular view of one or more virtual element(s), for example within a virtual environment corresponding to a particular real-world environment within which an aerial vehicle is operating. For example, profile view UAM visualization interface 400 includes a landing zone representation 408. In some embodiments, the landing zone representation 408 embodies a virtual representation within a virtual environment of a landing zone within a corresponding real-world environment. The landing zone representation 408 in some such embodiments indicates a ground level or other surface from which an aerial vehicle is to perform a vertical takeoff and/or vertical landing. In some embodiments, the landing zone representation 408 is depicted at a particular position in the profile view UAM visualization interface 400, for example based at least in part on an offset between a location of the aerial vehicle and the center of the landing zone corresponding to the landing zone representation 408.

Additionally or alternatively, in some embodiments, the profile view UAM visualization interface 400 includes a virtual corridor representation 404. In some embodiments, the virtual corridor representation 404 extends upwards from the landing zone representation 408. In some embodiments, the virtual corridor representation 404 defines a volume within which the aerial vehicle is safe to operate, for example during vertical takeoff and/or vertical landing. Alternatively in some embodiments, the virtual corridor representation 404 provides an intuitive mechanism for a pilot of an aerial vehicle to control the aerial vehicle in a manner that maintains a steady center alignment with the landing zone corresponding to the landing zone representation 408 regardless of visual confirmation of the landing zone by the pilot.

In some embodiments, the virtual corridor depicted in the virtual corridor representation 404 is generated based at least in part on one or more portion(s) of flight sensor data received by an aerial vehicle. For example, in some embodiments, the improved aerial operation visualization apparatus 200 processes flight sensor data to determine a safe volume to operate within above a landing zone based at least in part on the flight sensor data, and generates the virtual corridor therefrom. Additionally or alternatively, in some embodiments, one or more parameter(s) used in generating the virtual corridor corresponding to the virtual corridor representation 404 is predetermined, for example a position, a maximum height of the virtual corridor, a maximum radius at the top of a virtual corridor, and/or an angle of expansion for the virtual corridor beginning from the landing zone from which the virtual corridor extends. In some such embodiments, for example, the virtual corridor is embodied by a cylindrical volume extending from the radius (or other boundary) of a landing zone to which the aerial vehicle is to land. The landing zone may be determined from particular flight sensor data accessible to one or more system(s) of the aerial vehicle, for example flight detail data indicating a particular landing zone. In some embodiments, the virtual corridor corresponding to the virtual corridor representation 404 is generated based at least in part on a vehicle altitude for the aerial vehicle, the UAM altitude above a landing zone (e.g., factoring in the obstacle and/or landing zone altitude above a ground level), aerial vehicle attitude information (e.g., latitude, longitude pitch, yaw, and/or roll data for an aerial vehicle), and/or other object, structure, and/or environment data.

In some embodiments, the virtual corridor is specially configured to indicate particular data associated with the aerial vehicle corresponding to the virtual vehicle representation 402. For example, in some embodiments, the virtual corridor is configured to include a plurality of virtual corridor altitude indications 410*a*, 410*b*, and 410*c*. As depicted, each virtual corridor altitude indication embodies a ring around the circumference of the virtual corridor at a particular altitude. In some such embodiments, one or more of the virtual corridor altitude indications is highlighted or otherwise visually distinguished in circumstances where the virtual vehicle is next approaching the altitude indicated by the virtual corridor altitude indication, and/or in other embodiments in circumstances where the virtual vehicle has already reached and/or surpassed the altitude corresponding to the virtual corridor altitude information. For example, as depicted, the virtual corridor altitude indication 410*a* is highlighted a different color to indicate that the aerial vehicle corresponding to the virtual vehicle representation 402 is approaching the altitude 120 corresponding to the virtual corridor altitude indication 410*a*. In some such embodiments, the virtual corridor altitude indications 410*a*, 410*b*, and 410*c* provide improved situational awareness in an intuitive manner to better assist the pilot of the aerial vehicle in performing proper maneuvers (e.g., speed and/or direction control) during vertical takeoff and/or vertical landing (e.g., to achieve a soft landing with less risk and/or discomfort to the aerial vehicle and/or passenger(s) thereof).

The profile view UAM visualization interface 400 includes a virtual vehicle representation 402. The virtual vehicle representation 402 depicts a virtual vehicle corresponding to an aerial vehicle operating within a corresponding real-world environment. In some embodiments, the virtual vehicle depicted in the virtual vehicle representation 402 is configured based at least in part on flight sensor data and/or other available data that indicates physical attribute(s). In this regard, in some embodiments the improved aerial operation visualization apparatus 200 generates the profile view UAM visualization interface 400 including the virtual vehicle representation 402 in a manner that matches and/or approximates the look of the actual corresponding aerial vehicle based at least in part on such physical attribute data. Additionally or alternatively, in some embodiments the virtual vehicle depicted in the virtual vehicle representation 402 is configured based at least in part on current orientation and/or movement data of the aerial vehicle. For example, in some embodiments, the improved aerial operation visualization apparatus 200 generates the profile view UAM visualization interface 400 including the virtual vehicle representation 402 depicting a virtual vehicle at a particular orientation within the corresponding virtual environment. In this regard, in some embodiments the profile view UAM visualization interface 400 includes an accurate, virtual depiction of the aerial vehicle within an environment in which the aerial vehicle is operating.

As illustrated, the profile view UAM visualization interface 400 depicts the virtual elements from a side profile view. In some embodiments, for example, the improved aerial operation visualization apparatus 200 maintains a virtual environment including virtual element(s) corresponding to the virtual corridor representation 404, virtual vehicle representation 402, and/or landing zone representation 408. The improved aerial operation visualization apparatus 200 in some such embodiments generates the profile view UAM visualization interface 400 utilizing a viewport offset from the position of the virtual vehicle along the same plane defining an orientation of the virtual vehicle. In this regard, the profile view UAM visualization interface 400 provides a first projection and particular situational awareness for use by a pilot in maneuvering the aerial vehicle corresponding to the virtual vehicle representation 402. For example, as the aerial vehicle corresponding to the virtual vehicle representation 402 maneuvers (e.g., autonomously and/or due to pilot control), in some embodiments the profile view UAM visualization interface 400 dynamically updates in real-time to depict changes in the updated altitude, position, and/or other aspect(s) of the aerial vehicle. A pilot of the aerial vehicle may utilize such a profile view UAM visualization interface 400 to determine and/or implement appropriate maneuver(s) that control the aerial vehicle, for example to remain centered with respect to a landing zone and/or within a safe area of operation defined by the virtual corridor depicted therein. It also gives pilot, a sense of vertical speed variation and make necessary adjustment for soft touchdown.

In some embodiments, the profile view UAM visualization interface 400 includes one or more interface element(s) that intuitively indicate particular data useful to the pilot during operation of an aerial vehicle. For example, the profile view UAM visualization interface 400 includes altitude indicator elements 406. Specifically, the altitude indicator elements 406 embodies an altitude scale accurately depicting multiple altitude(s) in relation to a particular landing zone, for example corresponding to a landing zone representation. In this regard, the altitude indicator elements 406 accurately provide a visual and graphical representation of the altitude of an aerial vehicle as the aerial vehicle is brought closer to the landing zone (e.g., during vertical landing) and/or further from the landing zone (e.g., during vertical takeoff) without requiring the pilot to have visual confirmation of the actual landing zone. In some embodiments, one or more portion(s) of the altitude indicator elements 406 is/are visually distinguished based on a current and/or past data associated with operation of the aerial vehicle. For example, in some embodiments, the altitude indicator elements 406 includes larger, more opaque, and/or otherwise visually distinguished text information at a position in the indicator corresponding to the current altitude of the aerial vehicle.

Additionally or alternatively, in some embodiments the profile view UAM visualization interface 400 includes a vehicle center indicator 412. In some embodiments, the vehicle center indicator 412 extends from the center point of the virtual vehicle representation 402 until it makes contact with another virtual element (e.g., a virtual object, a virtual landing zone, virtual terrain, and/or the like). In this regard, the improved aerial operation visualization apparatus 200 in some embodiments renders an updated virtual vehicle representation 402 as the aerial vehicle maneuvers within the environment, for example by changing horizontal position with respect to the landing zone representation 408. In some such embodiments, a pilot may utilize the vehicle center indicator 412 to align the aerial vehicle regardless of visual contact with the landing zone and/or environment around the aerial vehicle in general.

Figure 5:
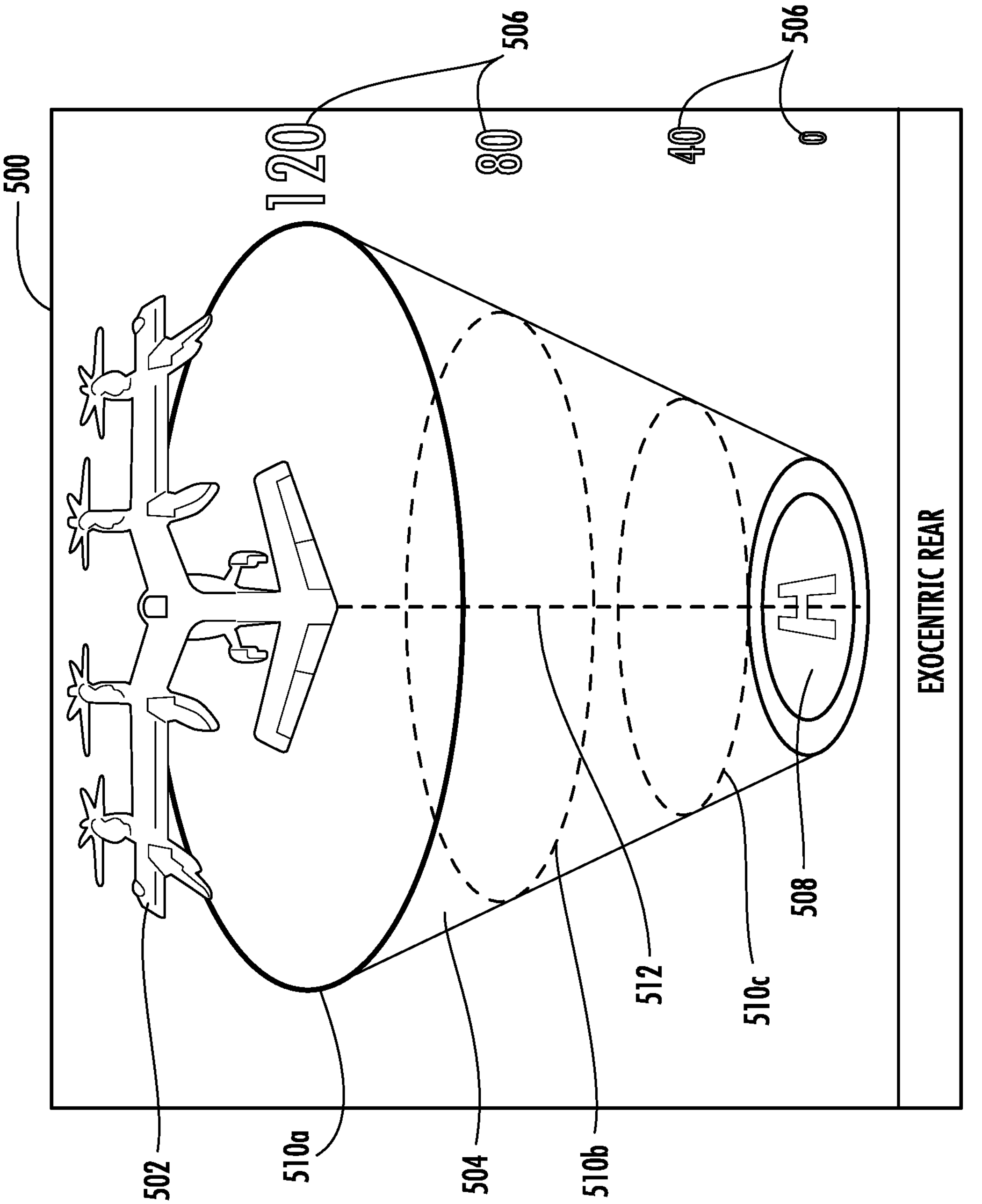
FIG. 5 illustrates an example exocentric view embodying an example UAM visualization interface in accordance with at least some example embodiments of the present disclosure.

FIG. 5 illustrates an example exocentric view embodying an example UAM visualization interface in accordance with at least some example embodiments of the present disclosure. Specifically, FIG. 5 depicts an example exocentric view UAM visualization interface 500. In some embodiments, the example exocentric view UAM visualization interface 500 is output as a user interface to be rendered to one or more display(s) of an aerial vehicle, for example embodied by and/or including the improved aerial operation visualization apparatus 200. Alternatively or additionally, in some embodiments, the improved aerial operation visualization apparatus 200 generates and/or outputs a user interface that includes the exocentric view UAM visualization interface 500 as a sub-interface. For example, in some embodiments, the improved aerial operation visualization apparatus 200 causes rendering to one or more display(s) of a user interface including a plurality of UAM visualization interfaces.

The exocentric view UAM visualization interface 500 depicts a particular, second view of one or more virtual element(s), for example within a virtual environment corresponding to a particular real-world environment within which an aerial vehicle is operating. In this regard, the exocentric view UAM visualization interface 500 in some embodiments includes one or more representation(s) of virtual element(s) similarly depicted and described with respect to the profile view UAM visualization interface 400. In some embodiments, the exocentric view UAM visualization interface 500 depicts such virtual element(s) from a different view, thus providing alternative and/or additional situational awareness to a pilot based at least in part on the individual view(s) and/or the combination of views.

As depicted, the exocentric view UAM visualization interface 500 includes a landing zone representation 508. In some embodiments, the landing zone representation 508 depicts the same landing zone as the landing zone representation 408 from a second view associated with a second perspective (e.g., an exocentric view). The landing zone representation 508 in some such embodiments indicates a ground level or other surface from which an aerial vehicle is to perform a vertical takeoff and/or vertical landing.

Additionally, or alternatively, the exocentric view UAM visualization interface 500 includes a virtual corridor representation 504. In some embodiments, the virtual corridor representation 504 is configured similarly to the similarly named virtual corridor representation 404. In this regard, each of the virtual corridor representation 504 and virtual corridor representation 404 may depict the same virtual corridor but from different perspectives. It will be appreciated that the different perspectives of the virtual corridor thus enable a pilot to obtain additional situational awareness associated with maneuvering the aerial vehicle in a safe volume within the environment during vertical takeoff and/or vertical landing without relying on the pilot to visually confirm aspects of the actual real-world environment, which may be impossible (e.g., due to vision being blocked by the aerial vehicle itself) or impractical (e.g., due to inclement weather).

The virtual corridor representation 504 further includes representations from alternative perspective of virtual corridor altitude indications for the depicted virtual corridor. Specifically, the exocentric view UAM visualization interface 500 includes representations of the virtual corridor altitude indications 510*a*, 510*b*, and 510*c*, each embodying a ring around the circumference of the virtual corridor at a particular altitude. In this regard, the pilot may visually inspect the exocentric view UAM visualization interface 500 to determine the next and/or previously passed altitude threshold and adjust operation of the aerial vehicle accordingly (e.g., to decrease speed during vertical landing for a soft landing).

The exocentric view UAM visualization interface 500 includes a virtual vehicle representation 502. The virtual vehicle representation 502 depicts, from a second perspective, the virtual vehicle depicted and described with respect to virtual vehicle representation 402 in FIG. 4. In this regard, the alternative perspective of the virtual vehicle provides additional situational awareness to the pilot without relying on the actual visual confirmation of the pilot. It will be appreciated that in some embodiments, the virtual vehicle is depicted in a manner that matches and/or approximates the look and feel of the actual corresponding aerial vehicle. Additionally or alternatively, in some embodiments, the virtual vehicle representation 502 depicts a configuration of a virtual vehicle based at least in part on current orientation and/or movement data of the aerial vehicle. For example, in some embodiments, the virtual vehicle representation 502 depicts the virtual vehicle with accurate pitch, yaw, roll, position in the environment, and/or the like, to accurately represent the corresponding aerial vehicle as the aerial vehicle is operated.

As illustrated, the exocentric view UAM visualization interface 500 depicts the virtual elements from an exocentric view. In some embodiments, for example, the improved aerial operation visualization apparatus 200 maintains a virtual environment including virtual element(s) corresponding to the virtual vehicle representation 502, virtual corridor representation 504, and/or landing zone representation 508. The improved aerial operation visualization apparatus 200 in some such embodiments generates the exocentric view UAM visualization interface 500 utilizing a viewport offset from the position of the virtual vehicle by a particular three-dimensional vector. In this regard, the exocentric view UAM visualization interface 500 provides a second perspective and particular situational awareness for use by the pilot in maneuvering the aerial vehicle corresponding to the virtual vehicle representation 502. In this regard, in some embodiments as the aerial vehicle corresponding to the virtual vehicle representation 502 is operated, the exocentric view UAM visualization interface 500 dynamically updates in real-time to depict changes in the updated altitude, position, and/or other aspects of the aerial vehicle. A pilot of the aerial vehicle may utilize the exocentric view UAM visualization interface 500, alone or in combination with one or more other UAM visualization interfaces such as profile view UAM visualization interface 400, to determine and/or implement appropriate maneuver(s) that control the aerial vehicle, for example to remain centered with respect to the landing zone and/or otherwise within a safe area of operation defined by the virtual corridor depicted therein.

In some embodiments, the exocentric view UAM visualization interface 500 includes one or more additional interface element(s) that intuitively provide data useful to the pilot during operation of an aerial vehicle. For example, in some embodiments, the exocentric view UAM visualization interface 500 includes altitude indicator elements 506. Specifically, the altitude indicator elements 506 embodies altitude text corresponding to the altitudes at which the virtual corridor altitude indications 510*a*, 510*b*, and 510*c* and a virtual landing zone are positioned. In some embodiments, the altitude indicator elements 506 visually distinguish one or more portion(s), for example based on flight sensor data indicating movement of the aerial vehicle. For example, in some embodiments, the exocentric view UAM visualization interface 500 is updated to visually distinguish each portion of the altitude indicator elements 506 as such a portion is reached. For example, in some embodiments, the altitude indicator elements 506 includes larger, more opaque, and/or otherwise visually distinguished text information at a position in the indicator corresponding to the current altitude of the aerial vehicle (as depicted with respect to the altitude "120").

The exocentric view UAM visualization interface 500 further includes a vehicle center indicator 512. In some embodiments, the vehicle center indicator 512 indicates a center of gravity of the associated aerial vehicle, and/or the position of said center of gravity with respect to a particular target landing zone. In this regard, the vehicle center indicator 512 may indicate an offset or other deviation in one or more direction(s) of the center associated with an aerial vehicle from a center point of a target landing zone. The vehicle center indicator 512 may be similarly configured and operate as described with respect to the vehicle center indicator 412 in FIG. 4. In this regard, the vehicle center indicator 512 indicates an alternative perspective of the center point of the virtual vehicle corresponding to the virtual vehicle representation 502 as the corresponding aerial vehicle is operated. In some such embodiments, a pilot may utilize the vehicle center indicator 512 to align the aerial vehicle with a landing zone in one or more directions (e.g., both an X and Y direction) based on the perspective of the exocentric view UAM visualization interface 500 as compared to the profile view UAM visualization interface 400, and without requiring visual contact between the pilot and one or more aspects of the environment.

Figure 6:
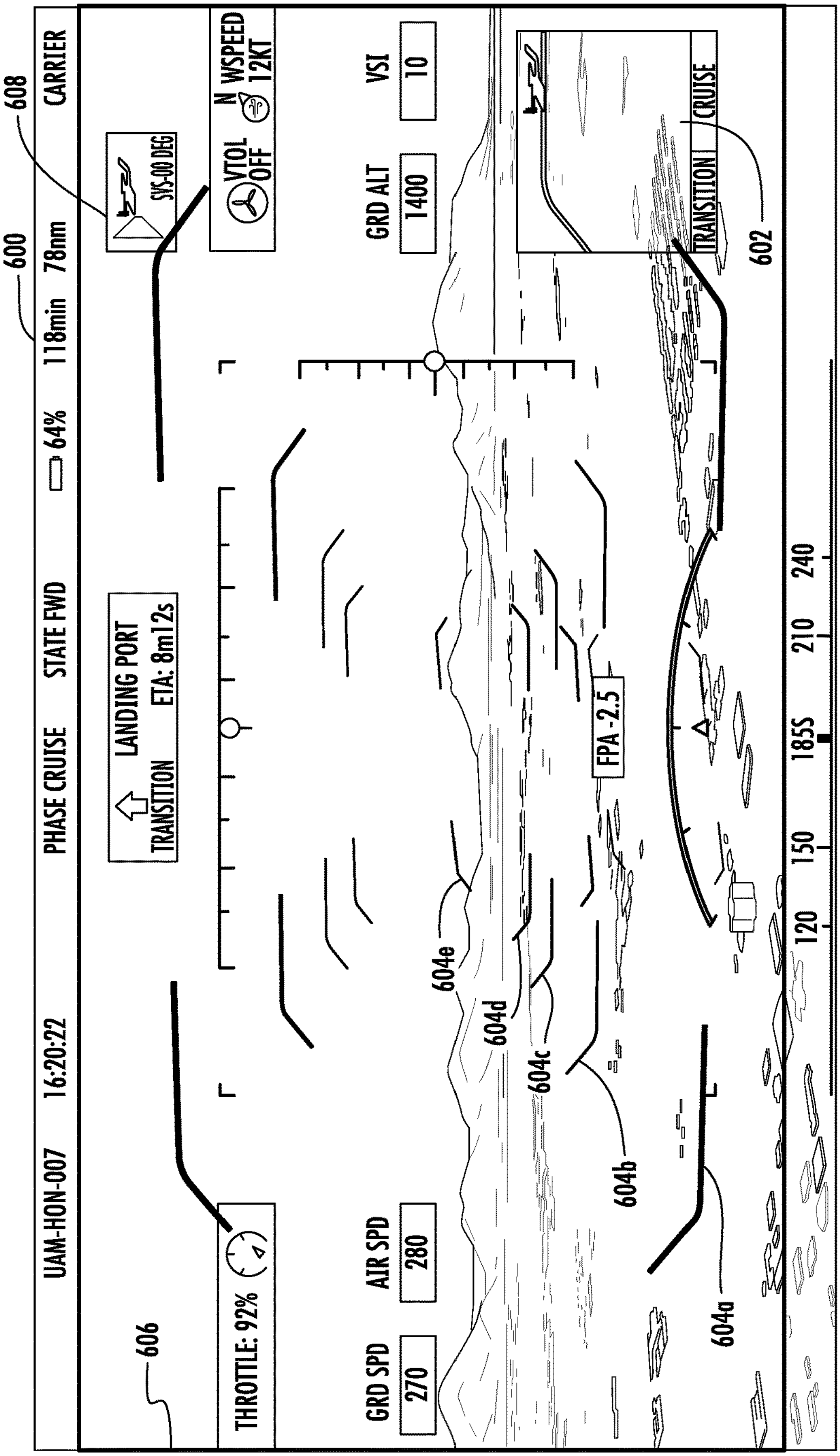
FIG. 6 illustrates an example user interface displayed during forward flight in accordance with at least some example embodiments of the present disclosure.

FIG. 6 illustrates an example user interface displayed during forward flight in accordance with at least some example embodiments of the present disclosure. Specifically, FIG. 6 depicts an example user interface 600. In some embodiments, the user interface 600 is rendered via one or more display(s) while an aerial vehicle is operating in a forward-flying operational mode, and/or in a transitional mode to and/or from one or more operational mode(s) associated with vertical landing and/or vertical takeoff. As depicted, FIG. 6 illustrates the user interface 600 while an aerial vehicle is operating in a forward-flying "cruise" operational mode.

The user interface 600 includes a primary view interface 606. As illustrated, the primary view interface 606 embodies an egocentric view depicted from the perspective of an aerial vehicle and/or corresponding virtual vehicle. In some embodiments, the primary view interface 606 depicts a representation of a real-world environment, for example captured via computer vision sensor(s) attached to and/or otherwise embodied in the aerial vehicle within the real-world environment. In some such embodiments, the real-world computer vision data is augmented with one or more virtual element(s), for example to generate an augmented reality interface including one or more virtual elements that assist a pilot in controlling the aerial vehicle along a particular flight path defined by flight plan data and/or other portion(s) of flight sensor data. Alternatively or additionally, in some embodiments, the primary view interface 606 depicts a captured representation of a virtual environment from a particular perspective defined by a particular viewport. The virtual environment may include any number of virtual element(s) corresponding to aspect(s) of the corresponding real-world environment, for example a virtual vehicle corresponding to the aerial vehicle operating in the real-world environment, one or more virtual structure(s) and/or object(s) corresponding to real-world structure(s) and/or object(s) of the real-world environment, virtual terrain corresponding to a real-world terrain, and/or the like.

In some embodiments, the improved aerial operation visualization apparatus 200 includes or otherwise is communicable with an SVS camera utilized to generate an egocentric view of the representations of the real-world environment, for example as depicted in the primary view interface 606. In some embodiments, the SVS camera is affixed at a particular position along the exterior of an aerial vehicle. In this regard, in some embodiments the improved aerial operation visualization apparatus 200 utilizes the SVS camera to capture image data representing a portion of the real-world environment, and render(s) the image data alone and/or with virtual element(s) rendered thereon (e.g., a virtual corridor, flight marker(s), and/or the like as described herein). In some embodiments, the SVS camera embodies a virtual camera depicting a portion of a virtual environment corresponding to the real-world environment.

The user interface includes a SVS camera sub-interface 608. In some embodiments, the SVS camera sub-interface 608 depicts an angle of an SVS camera utilized to depict the representation of the real-world environment. For example, in some embodiments, the improved aerial operation visualization apparatus 200 is configured to reorient the SVS camera to a particular desired angle, orientation, position, and/or the like. In some such embodiments, the improved aerial operation visualization apparatus 200 causes reorientation of the SVS camera based on any of a myriad of data-driven factor(s). For example, in some embodiments, the SVS camera is set to a rotation of 0 degrees to face forward in a circumstance where the improved aerial operation visualization apparatus 200 determines that the aerial vehicle is set to or otherwise operating in a forward-flying operational mode. The SVS camera sub-interface 608 depicts a representation of the aerial vehicle together with an angle of the SVS camera associated with the aerial vehicle and a viewport captured by said SVS camera.

It will be appreciated that the user interface 600 may include any of a myriad of other interface element(s) associated with operation of the aerial vehicle, navigation, and/or the like. Such interface element(s) may include data value(s) required (e.g., by regulation or other rule sets) to be output to an operator of an aerial vehicle. Alternatively or additionally, such interface element(s) may include data value(s) otherwise useful to an operator in one or more operational mode(s). Non-limiting examples of such interface element(s) include data representing ground speed indicator(s), air speed indicator(s), wind speed indicator(s), weather indicator(s), compass direction indicator(s), throttle indicator(s), navigation indicator(s), estimated time of arrival indicator(s), and/or the like. Some or all of such interface element(s) may remain persistent across multiple user interface(s), for example as the aerial vehicle changes between operational mode(s).

As illustrated the primary view interface 606 includes a plurality of flight markers 604*a* through 604*e*. In some embodiments, the flight markers 604*a* through 604*e* depict a flight path along which an aerial vehicle is to move. For example, in some embodiments, each flight marker defines a geometric volume or area through which the pilot (or the improved aerial operation visualization apparatus 200 or another control system in the context of a semi-autonomous or fully autonomous aerial vehicle) is to maneuver through to follow along a flight path assigned to the aerial vehicle. The flight marker(s) in some embodiments are defined based at least in part on flight detail data received and/or captured by the improved aerial operation visualization apparatus 200, for example as part of flight sensor data and/or previously stored data maintained by the improved aerial operation visualization apparatus 200.

In some embodiments, for example as depicted, the primary view interface 606 includes any number of sub-interfaces that provide additional contextual data to assist a pilot in efficiently achieving a complete situational awareness with respect to a particular real-world environment. As illustrated, the primary view interface 606 includes a sub-interface 602. In some embodiments, the sub-interface 602 embodies a UAM visualization interface depicting a profile view. The sub-interface 602 includes an alternative depiction of a virtual environment and virtual vehicle from another perspective other than an egocentric view, specifically a profile view depicting the virtual vehicle within the virtual environment. Additionally, the sub-interface 602 includes a line depicting the flight path along which the aerial vehicle is travelling.

The aerial vehicle may proceed traveling along the flight path, for example by following the flight markers 604*a*-604*e*, until a particular location is reached. For example, in some contexts, the aerial vehicle reaches a location along the flight path where the aerial vehicle initiates one or more operation(s) for landing, for example by performing a vertical landing. In this regard, in some embodiments, the aerial vehicle initiates a change to an operational mode associated with vertical landing. Accordingly, the user interface 600 may be updated and/or one or more other user interfaces may be rendered during vertical landing, for example to provide improved situational awareness to the pilot of the aerial vehicle via the improved aerial operation visualization apparatus 200.

Figure 7:
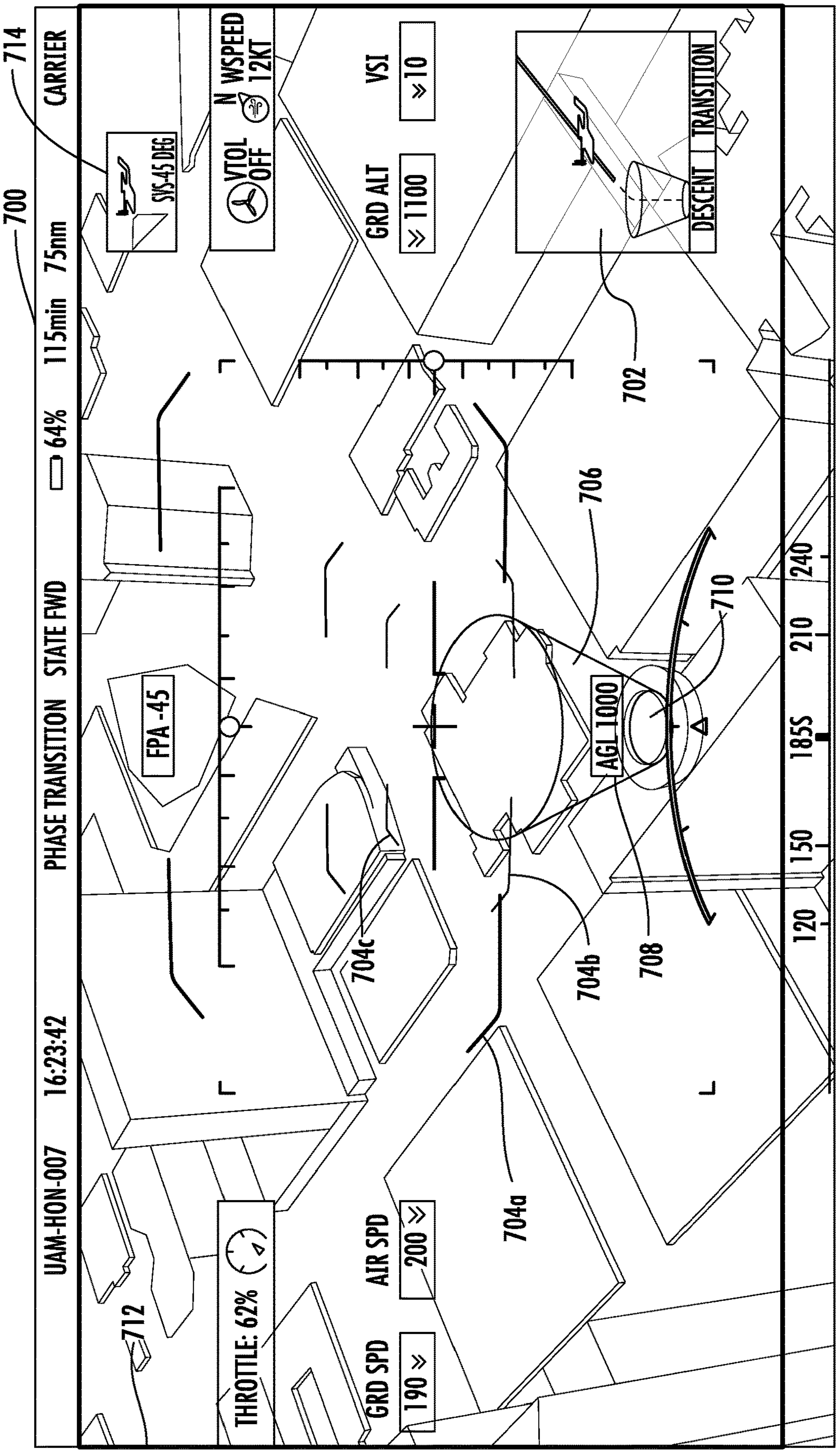
FIG. 7 illustrates an example user interface including UAM visualization interfaces depicting a virtual corridor on approach of a landing zone in accordance with at least some example embodiments of the present disclosure

FIG. 7 illustrates an example user interface including updating UAM visualization interfaces displayed during vertical landing of an aerial vehicle in accordance with at least some example embodiments of the present disclosure. For example, FIG. 7 depicts a user interface 700 that in some embodiments is rendered while the aerial vehicle is within a particular threshold distance from a transition point associated with initiating a vertical landing. In this regard, the user interface 600 as depicted and described with respect to FIG. 6 may be updated to include and/or otherwise represent the interface element(s) of the user interface 700, or in some embodiments the user interface 600 is de-rendered from one or more display(s) and the user interface 700 is rendered. As depicted, FIG. 7 illustrates the user interface 600 while an aerial vehicle is operating in a "transitional" operational mode between forward-flying and vertical landing.

The user interface 700 includes a primary view interface 712. In some embodiments, for example as illustrated, the primary view interface 712 embodies an egocentric view depicted from the perspective of a virtual vehicle corresponding to an aerial vehicle operating within a real-world environment. In this regard, the primary view interface 712 embodies one example UAM visualization interface. In some embodiments, the primary view interface 712 depicts a representation of virtual environment from a particular perspective defined by a particular viewport, for example associated with a virtual camera positioned in the virtual environment. As described herein, the virtual environment may include any number of virtual element(s) corresponding to aspect(s) of the corresponding real-world environment, for example a virtual vehicle corresponding to the aerial vehicle operating in the real-world, one or more virtual structure(s) and/or object(s) corresponding to real-world structure(s) and/or object(s) of the real-world environment, virtual terrain corresponding to a real-world terrain, and/or the like.

The user interface 700 includes an updated SVS camera sub-interface 714. As illustrated, the updated SVS camera sub-interface 714 indicates that an SVS camera of the aerial vehicle has rotated to a new angle of −45 degrees. Accordingly, the primary view interface 712 is updated to depict a representation of a portion of an environment that is within the viewport at the updated −45 degree angle. At the depicted angle, the SVS camera is rotated towards the ground of an environment while still maintaining some forward-facing viewport. Accordingly, in some embodiments the improved aerial operation visualization apparatus 200 sets the SVS camera to a particular determinable angle (e.g., −45 degrees) while in a particular operational mode, such as a transitional operational mode. As illustrated, the SVS camera and viewport depicted in the updated SVS camera sub-interface 714 are angled further towards the ground (e.g., by 45 degrees) than the corresponding SVS camera sub-interface 608 as depicted and described with respect to FIG. 6.

As illustrated, the primary view interface 712 includes a plurality of flight markers 704*a*-704*c*. In some embodiments, the flight markers 704*a*-704*c* are configured similarly to the flight markers 604*a*-604*e* as depicted and described with respect to FIG. 6. In this regard, the flight markers 704*a* through 704*c* define a final portion of a flight path on approach to a particular landing zone.

The primary view interface 712 includes a landing zone representation 710. In some embodiments, the landing zone representation 710 embodies a representation of a virtual landing zone corresponding to a particular landing zone in a real-world environment, where the aerial vehicle is to perform a vertical landing terminating at the landing zone. In this regard, the virtual landing zone depicted in the landing zone representation 710 in some embodiments is generated to accurately mirror the corresponding landing zone in the real-world environment, for example having the same dimensions and/or location in the virtual environment as the corresponding real-world landing zone in the real-world environment.

The primary view interface 712 further includes a virtual corridor representation 706. The virtual corridor representation 706 depicts a virtual corridor in the virtual environment that extends upwards from the virtual landing zone depicted in the landing zone representation 710. In this regard, the virtual corridor may define a safe area for operation within which a pilot is to operate the aerial vehicle during a vertical landing. The flight markers depicted end before the virtual corridor depicted in the virtual corridor representation 706. In this regard, the virtual corridor serves as a boundary for the aerial vehicle to safely operate, such that the pilot may utilize the virtual corridor to accurately control the aerial vehicle for landing at the landing zone.

Additionally, the primary view interface 712 includes a primary altitude element 708. In some embodiments, the primary altitude element 708 indicates the current altitude of the aerial vehicle. In some embodiments. The altitude value depicted via the primary altitude element 708 is determined based at least in part on altitude data from flight sensor data received by the improved aerial operation visualization apparatus 200. In this regard, the data value depicted via the primary altitude element 708 may update as the aerial vehicle approaches the landing zone depicted by the landing zone representation 710.

Additionally or alternatively, for example, as illustrated, the primary view interface 712 includes a sub-interface 702. In some embodiments, the sub-interface 702 embodies a UAM visualization interface depicting a profile view. The sub-interface includes a profile view of the virtual environment and virtual vehicle as depicted and described with respect to the sub-interface 602 of FIG. 6. Additionally, the sub-interface 702 includes a representation of the virtual corridor. The sub-interface 702 further includes a line indicating a transition point where a vertical landing is to commence (e.g., where the flight path line transitions from solid to dotted). In this regard, the pilot of the aerial vehicle (and/or one or more sub-system(s) controlling the aerial vehicle) may operate the aerial vehicle to reach the virtual corridor by following the flight markers 704*a*-704*c*, and subsequently perform a vertical landing operation utilizing the virtual corridor and associated UAM visualization interface(s).

Figure 8:
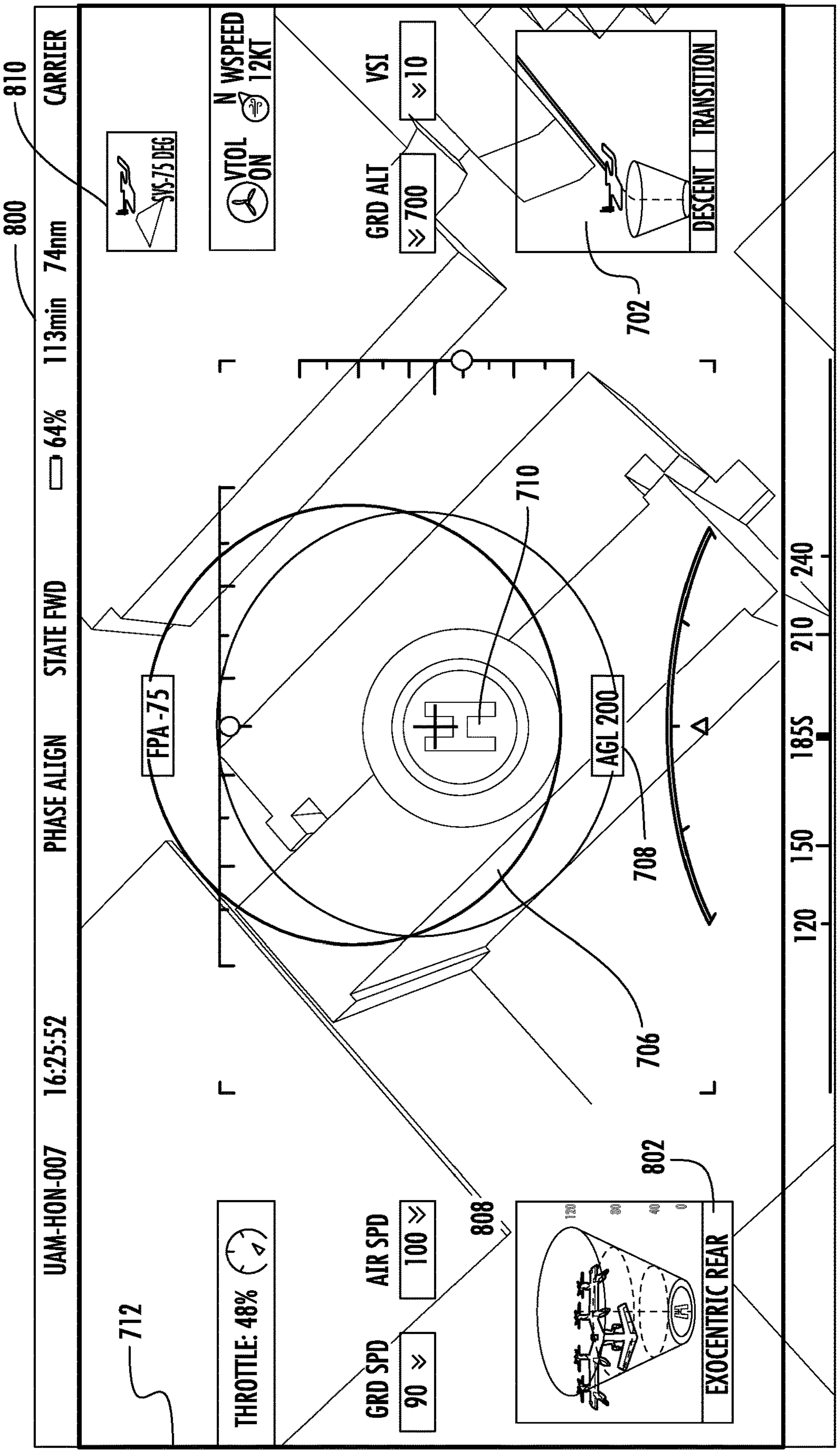
FIG. 8 illustrates an example user interface including UAM visualization interfaces at a transition point to a new operational mode associated with a vertical landing in accordance with at least some example embodiments of the present disclosure.

FIG. 8 illustrates an example user interface including UAM visualization interfaces at a transition point to a new operational mode associated with a vertical landing in accordance with at least some example embodiments of the present disclosure. For example, FIG. 8 depicts a user interface 800 that in some embodiments is rendered during transition from a first operational mode (e.g., a forward-flying operational mode) to a second operational mode associated with performing a vertical landing. In this regard, the user interface 700 as depicted and described with respect to FIG. 7 may be updated to include and/or otherwise represent the interface element(s) of the user interface 800. For example, in some embodiments, as the improved aerial operation visualization interface 200 detects and/or otherwise determines that an aerial vehicle is approaching a target landing zone (e.g., based at least in part on flight detail data and/or other flight sensor data, such as position data), the improved aerial operation visualization interface 200 in some embodiments automatically initiates rendering of particular UAM visualization interface(s) and/or other sub-interfaces on top of the user interface 700 and/or particular sub-interface(s) thereof. In some other embodiments, the user interface 700 is de-rendered from one or more display(s) and the user interface 800 is rendered. As illustrated, the user interface 800 includes one or more interface element(s) similarly numbered as depicted and described with respect to FIG. 7. For purposes of brevity and clarity of the disclosure, repeated description of these similarly numbered and named interface element(s) is omitted.

The user interface 800 includes an updated SVS camera sub-interface 810. As illustrated, the updated SVS camera sub-interface 810 indicates that an SVS camera of the aerial vehicle has rotated to a new angle of −75 degrees. Accordingly, the primary view interface 712 is updated to depict a representation of a portion of an environment that is within the viewport at the updated −75 degree angle. At the depicted angle, the SVS camera is further rotated towards the ground of an environment as the aerial vehicle approaches a point at which vertical landing is initiated. Accordingly, in some embodiments the improved aerial operation visualization apparatus 200 sets the SVS camera to a particular determinable angle (e.g., −75 degrees) upon exiting a particular operational mode and entering another particular operational mode, such as changing from a transitional operational mode to a vertical landing mode. Additionally or alternatively, in some embodiments, the improved aerial operation visualization apparatus 200 sets an orientation (e.g., a rotation angle in one or more direction(s)) of the SVS camera based at least in part on flight sensor data, for example an altitude of the aerial vehicle, speed data, and/or the like. As illustrated, the SVS camera and viewport depicted in the updated SVS camera sub-interface 810 are angled even further towards the ground (e.g., by 75 degrees) than the corresponding SVS camera sub-interface 608 as depicted and described with respect to FIG. 6. In this regard, in some embodiments, the improved aerial operation visualization apparatus 200 continues to rotate a SVS camera to face a ground of the environment as the aerial vehicle approaches a point along a flight path where a vertical landing process is initiated.

The user interface 800 includes a newly rendered exocentric view interface 802 embodying an additional UAM visualization interface. In some embodiments, the improved aerial operation visualization apparatus 200 causes rendering of the exocentric view interface 802 upon detecting a change in operational mode. For example, in some embodiments, the improved aerial operation visualization apparatus 200 detects a change in operational mode automatically or in response to user input, that sets the operational mode to a vertical landing operational mode. In some such embodiments, the improved aerial operation visualization apparatus 200 causes rendering of the exocentric view interface 802 in response. It will be appreciated that the exocentric view interface 802 in some embodiments includes each of the element(s) depicted and described with respect to the example exocentric view UAM visualization interface 500 herein.

As illustrated, the exocentric view interface 802 depicts representation(s) of virtual element(s) of a virtual environment from a particular perspective, for example defined by a viewport of a virtual camera positioned in the virtual environment. Exocentric view interface 802 for example depicts an exocentric view of the virtual environment from a third-person rear view of a virtual vehicle corresponding to an aerial vehicle in a corresponding real-world environment. As illustrated, the exocentric view interface 802 includes a virtual vehicle representation 808 that depicts the virtual vehicle within the virtual environment in relation to a virtual corridor. In some embodiments, the horizontal (e.g., X-axis and Y-axis) and/or vertical (e.g., Z-axis) position of the virtual vehicle depicted in the virtual vehicle representation 808 may be defined based at least in part on the actual position of a corresponding aerial vehicle with respect to the virtual corridor. In some embodiments, the virtual vehicle representation 808 includes a viewport centered on the center point of a virtual landing zone corresponding to the depicted virtual corridor, providing an intuitive offset between the position of the aerial vehicle and the corresponding landing zone based on the offset between the representation of the vertical vehicle and the representation of the virtual landing zone in the virtual environment. In some such embodiments, the exocentric view interface 802 is rendered to assist the pilot with the vertical landing, and hidden or otherwise not rendered before then to avoid unnecessarily cluttering the user interface.

In some embodiments, the improved aerial operation visualization apparatus 200 activates one or more particular sensor(s) once a transition point for initiating a change to a vertical landing operational mode is reached. For example, in some embodiments, the improved aerial operation visualization apparatus 200 activates one or more high-accuracy altimeter(s) that provide more detailed altimeter data representing a current altitude of the aerial vehicle. In some such embodiments, the improved aerial operation visualization apparatus 200 utilizes such detailed information to accurately update the position of a corresponding virtual vehicle in a virtual environment, for example continuously and/or in real-time, as such data is received.

Figure 9:
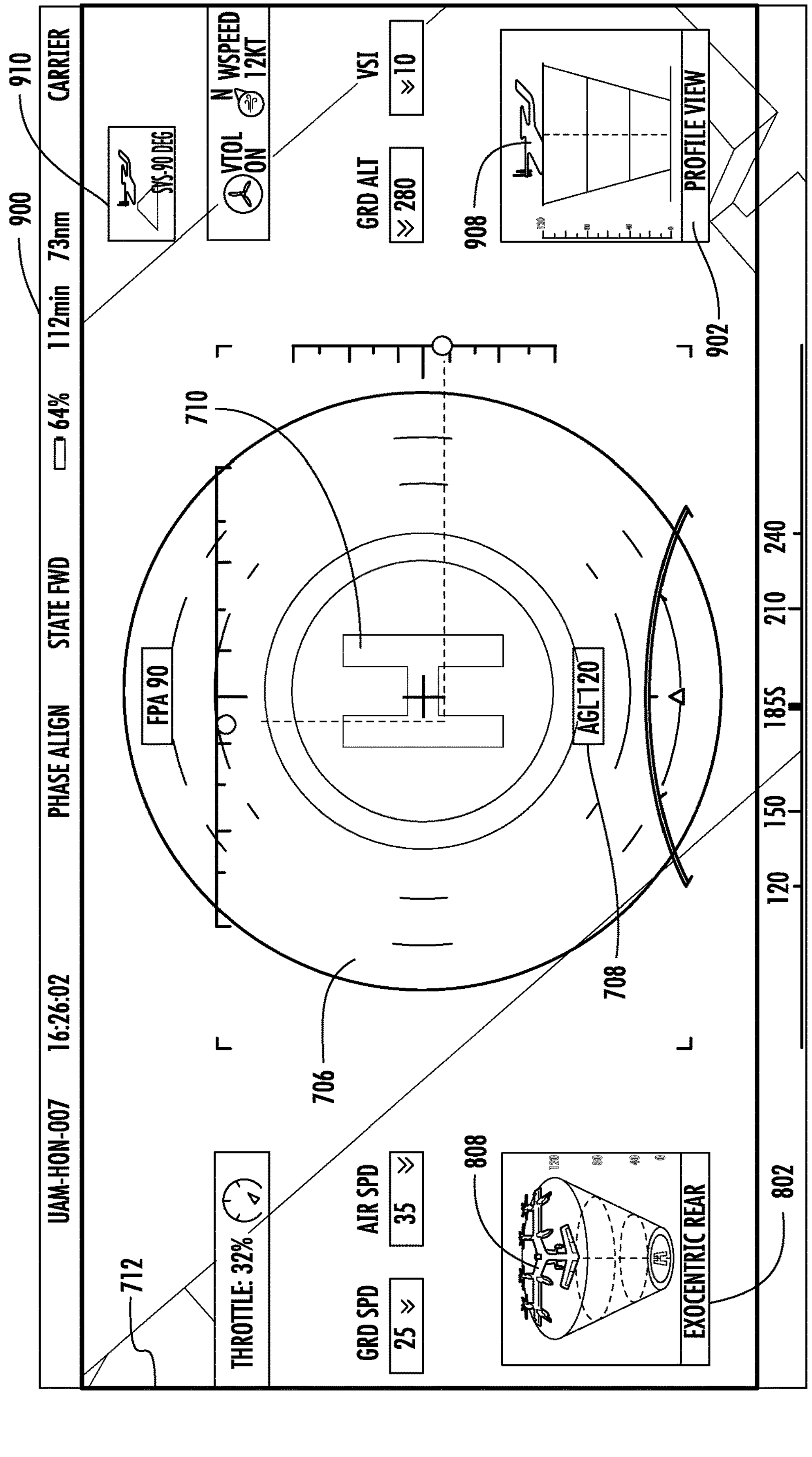
FIG. 9 through FIG. 12 each illustrate an example user interface including updating UAM visualization interfaces displayed during vertical landing of an aerial vehicle in accordance with at least some example embodiments of the present disclosure.

FIG. 9 through FIG. 12 illustrates an example user interface including updating UAM visualization interfaces displayed during vertical landing of an aerial vehicle in accordance with at least some example embodiments of the present disclosure. For example, FIG. 9 depicts a user interface 900 that in some embodiments is rendered while an aerial vehicle is operating in a particular operational mode associated with performing a vertical landing. In this regard, the user interface 800 as depicted and described with respect to FIG. 8 may be updated to include and/or otherwise represent the interface element(s) of the user interface 900, or in some embodiments the user interface 800 is de-rendered from one or more display(s) and the user interface 900 is rendered. As illustrated, the user interface 900 includes one or more interface element(s) similarly numbered as depicted and described with respect to FIG. 8.

The user interface 900 includes an updated SVS camera sub-interface 910. As illustrated, the updated SVS camera sub-interface 910 indicates that an SVS camera of the aerial vehicle has rotated to a new angle of −90 degrees, such that it fully faces the ground of an environment associated with the aerial vehicle. Accordingly, the primary view interface 712 is updated to depict a representation of a portion of an environment that is within the viewport at the updated −90 degree angle. At the depicted angle, the SVS camera is further rotated such that the viewport extends perpendicularly to the ground of an environment as the aerial vehicle during a vertical landing process. Accordingly, in some embodiments the improved aerial operation visualization apparatus 200 sets the SVS camera to a particular determinable angle (e.g., −90 degrees) within a particular time from which a vertical landing operational mode is initiated. Additionally or alternatively, in some embodiments, the improved aerial operation visualization apparatus 200 sets an orientation (e.g., a rotation angle in one or more direction(s)) of the SVS camera based at least in part on flight sensor data, for example an altitude of the aerial vehicle, speed data, and/or the like. As illustrated, the SVS camera and viewport depicted in the updated SVS camera sub-interface 910 are angled even further towards the ground (e.g., by 90 degrees) than the corresponding SVS camera sub-interface 608 as depicted and described with respect to FIG. 6.

As illustrated, each of the depicted sub-interfaces of the user interface 900 updates as the aerial device maneuvers during vertical landing. For example, as illustrated, in some embodiments the improved aerial operation visualization apparatus 200 causes updated rendering of the primary altitude element 708 to depict a new data value representing the current altitude of the aerial vehicle. Additionally or alternatively, it will be appreciated that in some embodiments the depicted portion of the virtual environment depicted in the primary view interface 712 may differ as the aerial vehicle moves through the corresponding real-world environment, even if only slightly. For example, as the aerial vehicle further approaches a landing zone, the virtual corridor representation 706 appears larger as the viewport similarly approaches the virtual corridor. Similarly, the virtual vehicle representation 808 depicted in the exocentric view interface 802 updates as the pilot controls the position of the aerial vehicle.

As illustrated, the user interface 900 further includes a profile view interface 902. The profile view interface 902 depicts a particular portion of a virtual environment from a profile perspective associated with the virtual vehicle therein. In some embodiments, the profile view interface 902 includes some or all interface element(s) as depicted and described with respect to profile view UAM visualization interface 400 herein. In this regard, it will be appreciated that the profile view interface 902 in some embodiments includes various representation(s) of virtual element(s) that may provide context and/or situational awareness to a pilot of an associated aerial vehicle. For example, as illustrated, the profile view interface 902 includes a virtual vehicle representation 908 indicating the position of a virtual vehicle within a virtual environment with respect to a virtual corridor in the virtual environment.

In some embodiments, the improved aerial operation visualization interface 200 is configured to enable a user (e.g., an operator of the aerial vehicle associated therewith) to trigger rendering and/or de-rendering (e.g., "hiding") of one or more interface element(s). For example, in some embodiments, the improved aerial operation visualization interface 200 receives user input via one or more peripheral (s) and/or via user interface element(s) rendered to one or more user interface(s) (not depicted) that indicate a user request to hide the profile view interface 902 and/or the exocentric view interface 802. In some such embodiments, the primary view interface 712 cannot be de-rendered. In this regard, the user may utilize such rendering and/or de-rendering requests to de-clutter such user interface(s) in circumstances where such sub-interface(s) are deemed not helpful, and/or provide such sub-interfaces in circumstances where they are deemed helpful.

Figure 10:
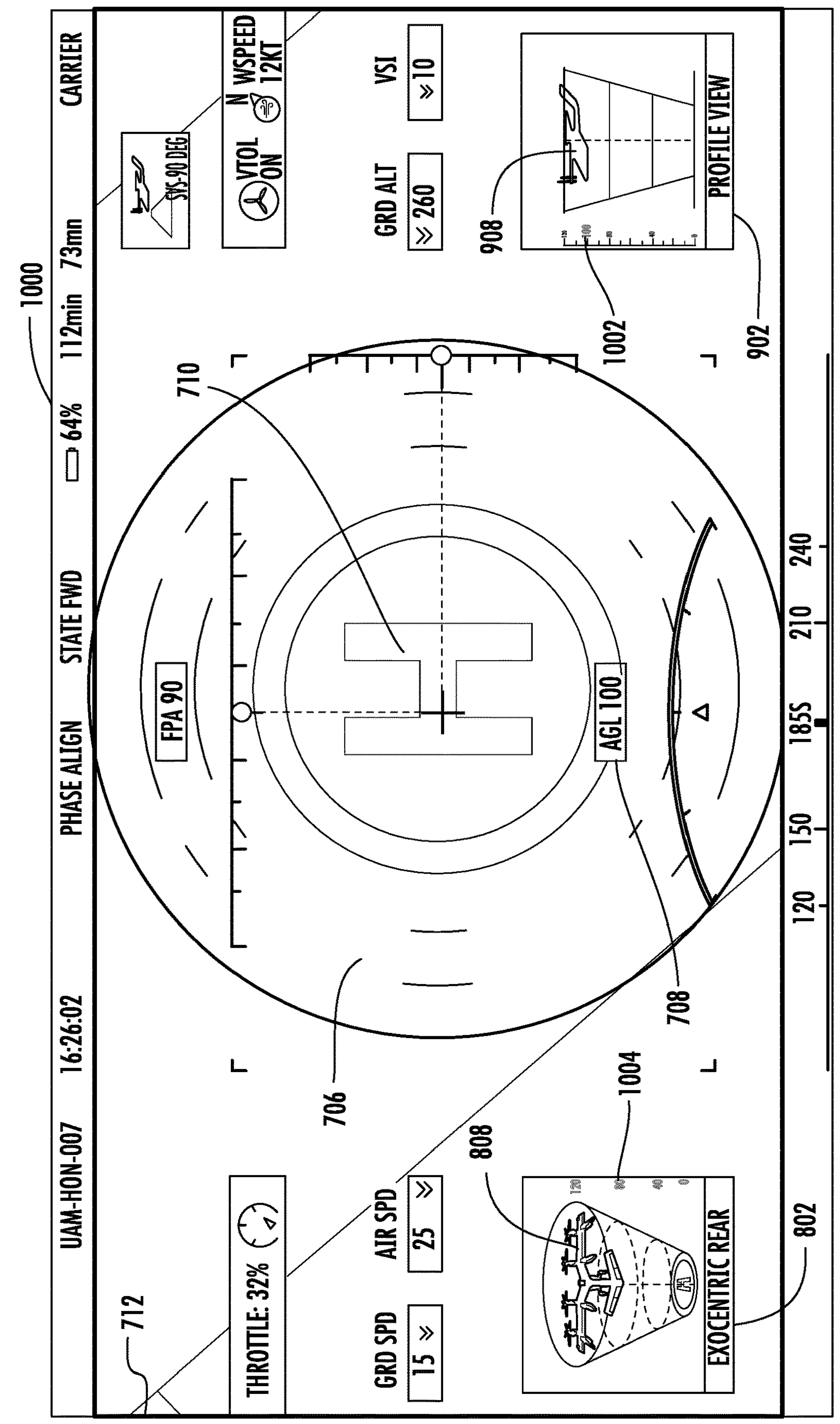

As the pilot or one or more computing system(s) (e.g., the improved aerial operation visualization apparatus 200 and/or an associated control system) operates the aerial vehicle, the user interface(s) depicted during vertical landing may update to reflect a new state. For example, FIG. 10 illustrates an example user interface including updating UAM visualization interfaces displayed during vertical landing of an aerial vehicle in accordance with at least some example embodiments of the present disclosure. As illustrated, for example, the pilot (for example) controls the aerial vehicle to lower the aerial vehicle during a vertical landing procedure. Accordingly, in some embodiments, the improved aerial operation visualization apparatus 200 receives and/or otherwise captures new data (e.g., new flight sensor data) and utilizes such data to update one or more aspect(s) of the virtual environment and/or update rendering of the one or more user interface(s) based at least in part on such new data.

As depicted in FIG. 10, the improved aerial operation visualization apparatus 200 updates rendering of one or more user interface(s), for example the user interface 900, to depict the user interface 1000. In some embodiments, the primary altitude element 708 is again updated to represent a new data value further indicating a lower altitude as the aerial vehicle descends during a vertical landing. In this regard, in some embodiments the improved aerial operation visualization apparatus 200 further updates a position associated with a virtual vehicle in a virtual environment corresponding to the aerial vehicle in a real-world environment. In some such embodiments, the primary view interface 712 is updated to represent a new view of the virtual environment based at least in part on the updates to the virtual environment. For example, in some embodiments, the virtual camera that captures or otherwise embodies a viewport representing a portion of the virtual environment to be rendered via the primary view interface 712 approaches the virtual landing zone represented in the landing zone representation 710.

Additionally or alternatively, in some embodiments, the improved aerial operation visualization apparatus 200 causes updating of one or more other UAM visualization interface(s). For example, in some embodiments, the exocentric view interface 802 is updated to reflect an update to the position of the virtual vehicle depicted in the virtual vehicle representation 808. As illustrated, the virtual vehicle is depicted in the virtual vehicle representation 808 at a lower altitude in response to the downward movement of the corresponding aerial vehicle between the time depicted with respect to user interface 800 and the time depicted with respect to user interface 900. Additionally, as illustrated the exocentric view interface 802 is updated to include a dynamic altitude indicator element 1004 that indicates, within the exocentric view interface 802, the current altitude indicator of the virtual corridor depicted therein that the virtual vehicle is approaching. For example, as illustrated, the dynamic altitude indicator element 1004 visually distinguishes the altitude indicator “80” as the aerial vehicle has already descended past 120. It should be appreciated that the altitude data value(s) may be provided in any desired unit.

Similarly, in some embodiments, the profile view interface 902 is updated to reflect an update to the position of the virtual vehicle. As illustrated, the virtual vehicle is depicted via the virtual vehicle representation 908 at a lower altitude within the view depicted via in the profile view interface 902. Additionally, in some embodiments, the profile view interface 902 is updated to include a dynamic altitude indicator element 1002 that indicates, within the profile view interface 902, the current altitude of the virtual vehicle corresponding to the aerial vehicle on a defined scale. For example, as illustrated, the dynamic altitude indicator element 1002 visually distinguishes the altitude “100,” representing the current altitude of the actual aerial vehicle and corresponding virtual vehicle. It will be appreciated that, in this regard, the dynamic altitude indicator element 1002 and the primary altitude element 708 in some such embodiments represent the same data value.

In some embodiments, a pilot of the aerial vehicle analyzes the rendered user interface(s), and/or sub-interfaces thereof embodying UAM visualization interfaces for example, to accurately control the aerial vehicle safely and without visual confirmation of the actual real-world environment. For example, in some embodiments, the user interface is updated in real-time as flight sensor data is continuously received, captured, and/or the like. Accordingly, the various virtual element(s) of the virtual environment corresponding to element(s) of the real-world environment may be updated, for example based on updated position(s), orientation(s), movement data, and/or the like. Similarly, the depiction(s) of virtual environment represented in the UAM visualization interface(s) may similarly be updated in real-time to depict at least the position of the virtual vehicle with respect to a virtual corridor. In this regard, the pilot may analyze the user interface(s) and/or particular UAM visualization interface(s) thereof to guide the virtual vehicle safely down the virtual corridor to complete a safe vertical landing without reliance on visual confirmation of the real-world environment, which may be blocked, obfuscated, or otherwise not capable of being visually inspected with sufficient accuracy.

Figure 11:
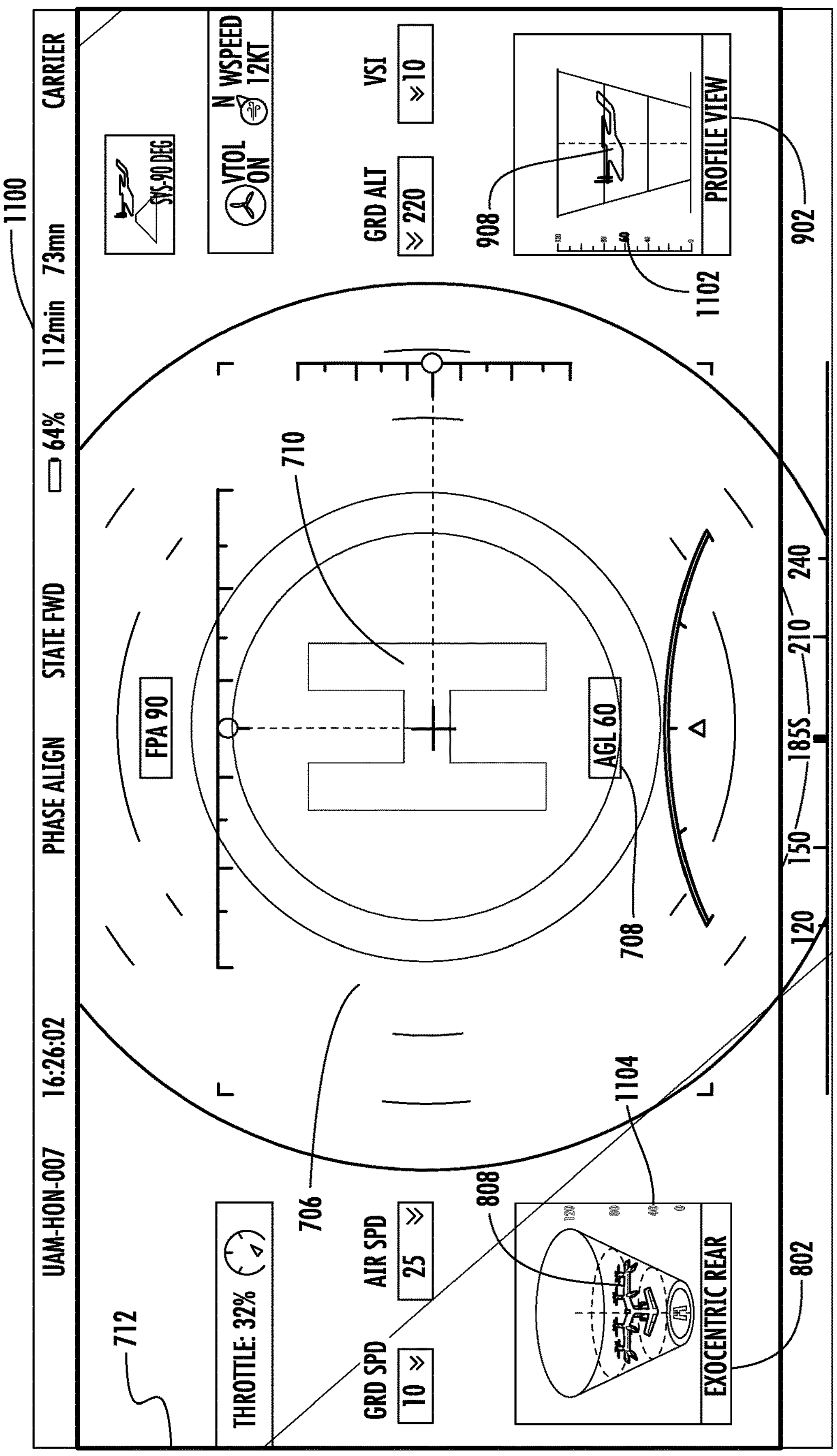

FIG. 11, for example, depicts a next step as the user interface is updated during operation of a vertical landing. As illustrated, the altitude of the aerial vehicle has decreased, as indicated by the data value depicted via primary altitude element 708. Additionally, the position of the virtual vehicle depicted by virtual vehicle representation 808 further descends within the virtual corridor. Similarly, the position of the virtual vehicle representation 908 is similarly updated to indicate the descent of the virtual vehicle. The improved aerial operation visualization apparatus 200 further updates the exocentric view interface 802 to include dynamic altitude indicator element 1104, which visually distinguishes the altitude indicator “40” as the aerial vehicle has previously descended past the previous threshold of 80. Additionally, the improved aerial operation visualization apparatus 200 further updates the profile view interface 902 to include dynamic altitude indicator element 1102, which represents the current altitude of the aerial vehicle of “60.”

Figure 12:
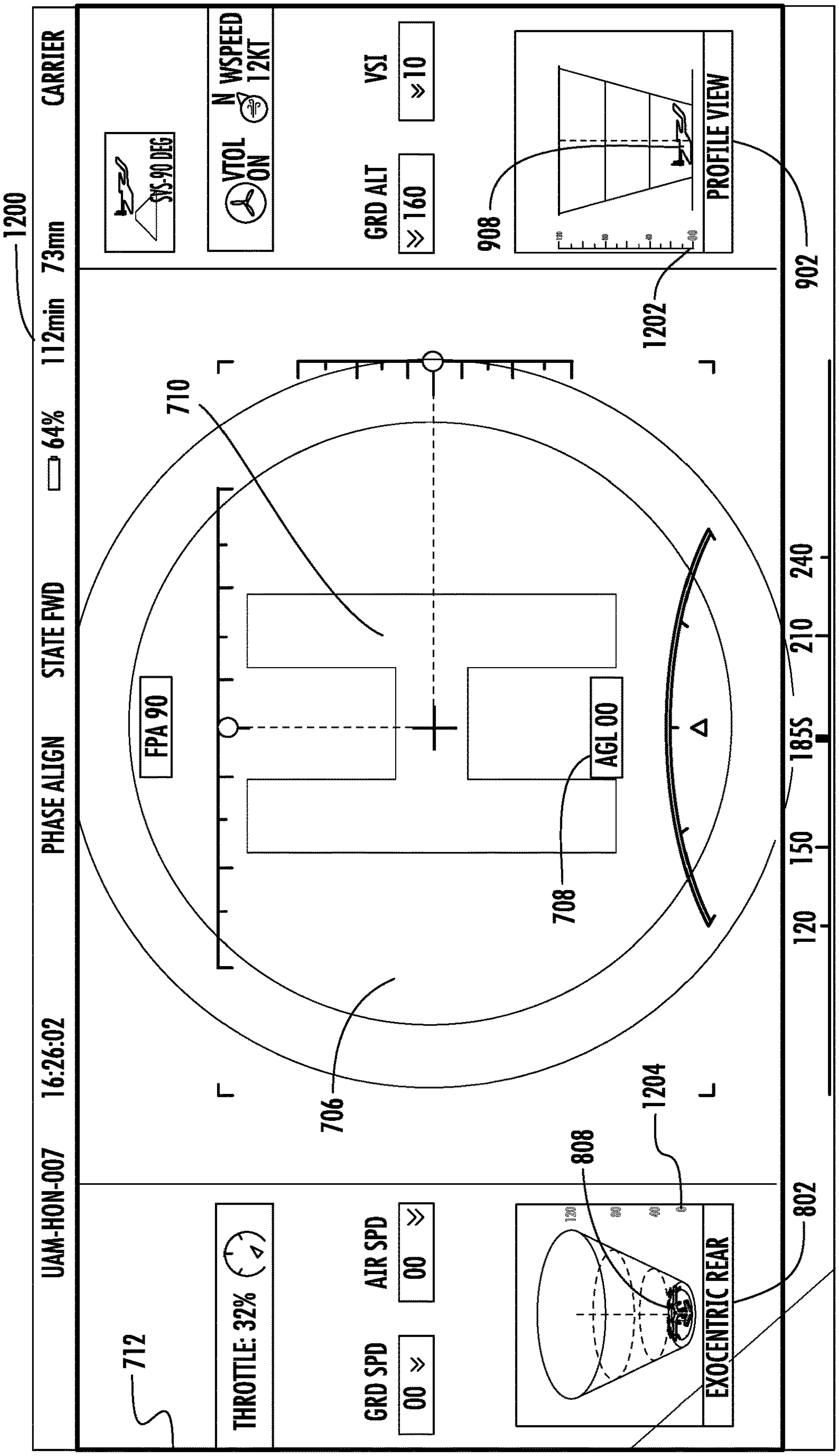

FIG. 12 depicts a final step as the user interface is updated during operation of a vertical landing. As illustrated, the altitude of the aerial vehicle has decreased to 0, as indicated by the data value depicted via primary altitude element 708, and therefore indicating a landing operation has been successfully completed. Additionally, the position of the virtual vehicle depicted by virtual vehicle representation 808 further descends within the virtual corridor to make contact with the virtual landing zone, depicting that the aerial vehicle has successfully landed. Similarly, the position of the virtual vehicle representation 908 is similarly updated to indicate the descent of the virtual vehicle. The improved aerial operation visualization apparatus 200 further updates the exocentric view interface 802 to include dynamic altitude indicator element 1204, which visually distinguishes the altitude indicator “0” as the aerial vehicle has reached the lowest altitude indicator associated with the virtual corridor. Additionally, the improved aerial operation visualization apparatus 200 further updates the profile view interface 902 to include dynamic altitude indicator element 1202, which represents the current altitude of the aerial vehicle of “0.” It will be appreciated that the pilot may power off the aerial vehicle, change operational mode(s), and/or otherwise control the aerial vehicle for another purpose once the vertical landing is completed.

In some embodiments, a plurality of UAM visualization interfaces are rendered via different displays of an aerial vehicle. For example, in some embodiments, the primary view interfaces 712 is rendered via a primary flight display of an aerial vehicle during operation of a vertical landing and/or vertical takeoff. Additionally, the exocentric view interface 802 and/or the profile view interface 902 in some embodiments is/are rendered to a secondary flight display of the aerial vehicle. In other embodiments, the exocentric view interface 802 and/or profile view interface 902 is/are rendered as sub-interfaces of the primary view interface 712 as depicted and described.

Figure 13:
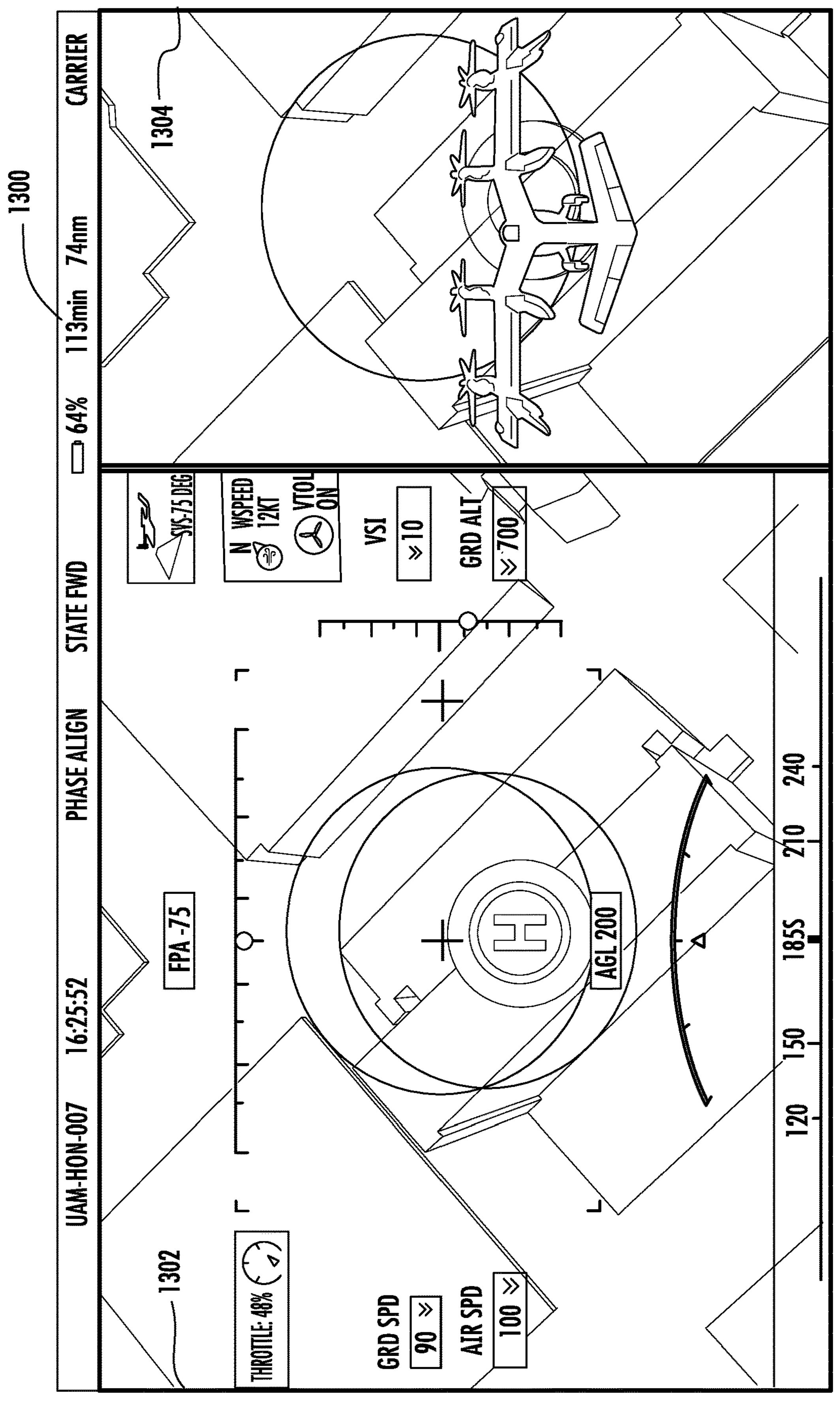
FIG. 13 illustrates an example user interface including side-by-side UAM visualization interfaces in accordance with at least some example embodiments of the present disclosure.

In other embodiments, the improved aerial operation visualization apparatus 200 causes rendering of UAM user interfaces in any of a myriad of configuration(s). For example, FIG. 13 illustrates an example user interface including side-by-side UAM visualization interfaces in accordance with at least some example embodiments of the present disclosure. Specifically, FIG. 13 depicts an example user interface 1300 including a side-by-side egocentric view interface 1302 and a side-by-side exocentric view interface 1304. In this regard, the side-by-side interfaces may be rendered via a single display. It will be appreciated that in some embodiments the improved aerial operation visualization apparatus 200 determines the layout of UAM visualization interfaces based at least in part on one or more data parameter value(s). For example, in some embodiments, the improved aerial operation visualization apparatus 200 arranges UAM visualization interface(s) into one or more user interface(s) based on a OEM identifier determined for the aerial vehicle. Alternatively or additionally, in some embodiments, the improved aerial operation visualization apparatus 200 arranges UAM visualization interface(s) into one or more user interface(s) based on a user identifier corresponding to the pilot of the aerial vehicle, for example upon authorization of the pilot associated with a particular user identifier and/or account. Alternatively or additionally, in some embodiments, the improved aerial operation visualization apparatus 200 arranges the UAM visualization interface(s) based at least in part on user input selecting an arrangement of such UAM visualization interface(s) (e.g., selecting from side-by-side, single interface with sub-interfaces, multi-display, and/or the like).

It will be appreciated by one having ordinary skill in the art that the virtual corridor similarly provides contextual awareness for vertical takeoff as well as vertical landing. For example, in some embodiments, one or more UAM visualization interface(s) is/are provided via one or more display(s) to enable an operator of an aerial vehicle (e.g., a pilot) to ascertain situational awareness while operating the aerial vehicle for vertical takeoff. The virtual corridor and/or associated indicators included in a UAM visualization interface, for example, in some embodiments similarly defines a safe area within which the pilot may operate the aerial vehicle. Additionally or alternatively, in some embodiments, the indicator(s) associated with a virtual corridor enable an operator to intuitively ascertain situational awareness to control one or more aspect(s) of operating the aerial vehicle, for example a speed and/or position with respect to a landing zone. Additionally, in some embodiments, the UAM visualization interface(s) depicted and/or described are provided while the aerial vehicle is detected or otherwise determined to be in a vertical takeoff operational mode. In some such embodiments, one or more UAM visualization interface(s) is de-rendered upon transitioning from the vertical takeoff operational mode to another mode (e.g., a forward-flight operational mode or other in-flight operational mode) to reduce visual clutter in circumstances where such UAM visualization interface(s) are less pertinent to the operator.

In this regard, it will be appreciated that the FIGS. 6 through 12 depict one example of operation and user interface(s) depicted during a vertical landing process in accordance with at least some example embodiments of the present disclosure. Similarly, the FIGS. 12 through 6 (considered in this reverse numerical order) depict and describe operations performed in accordance with at least some example embodiments of the present disclosure during vertical takeoff. In some embodiments, the configuration of the user interface(s) and/or UAM visualization interface(s) therein need not be the same during vertical takeoff and vertical landing.

Example Processes of the Disclosure

Having described example systems, apparatuses, flight sensor data properties, and user interfaces and specially configured interface elements thereof in accordance with the present disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 14:
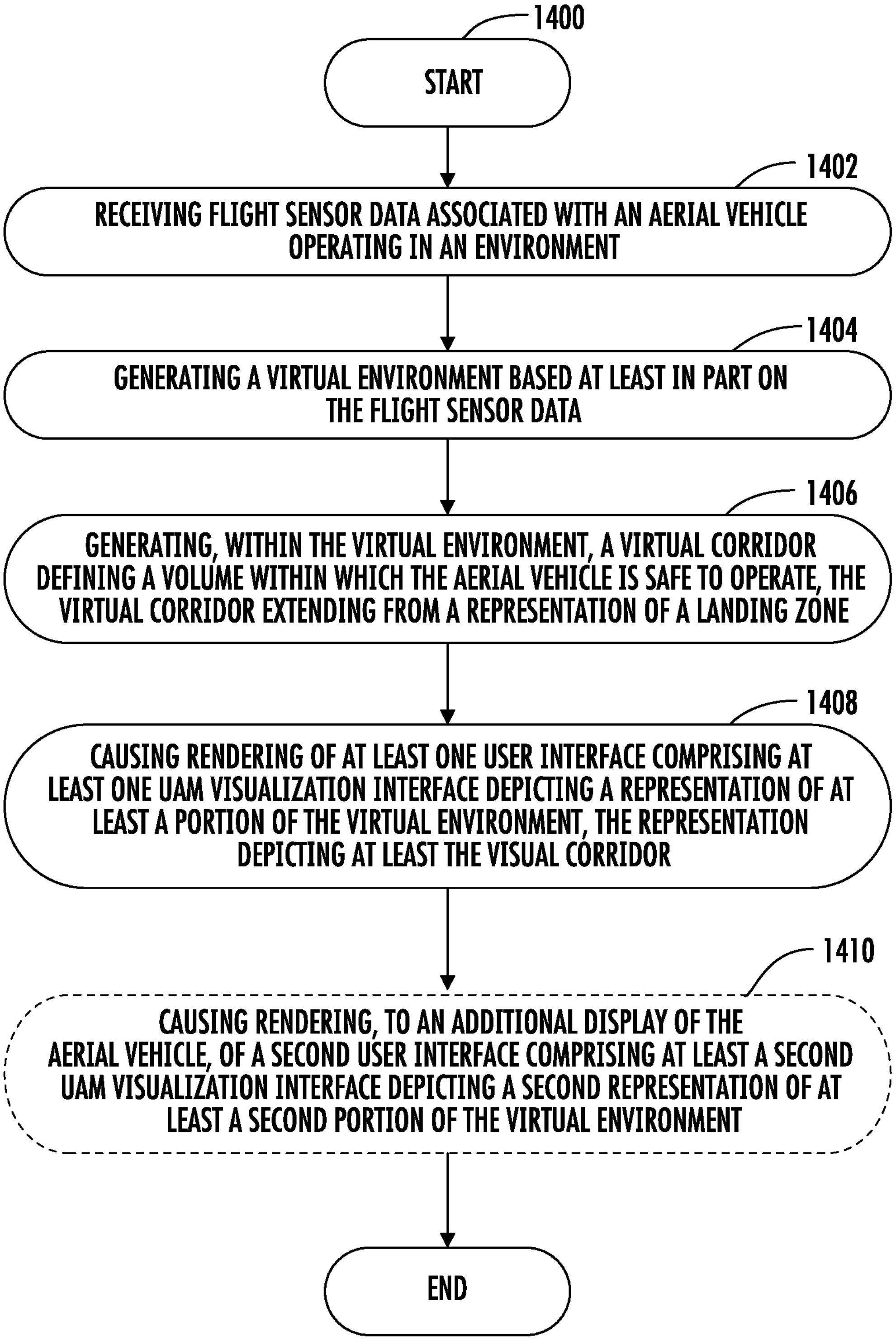
FIG. 14 illustrates a flowchart embodying operations of an example process for generating improved user interfaces in accordance with at least some example embodiments of the present disclosure.

FIG. 14 illustrates a process for causing rendering of one or more specially configured user interface(s) comprising UAM visualization interface(s) in accordance with at least some embodiments of the present disclosure. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the improved aerial operation visualization apparatus 200 alone or in communication with one or more other component(s), device(s), system(s), and/or the like. In this regard, in some such embodiments, the improved aerial operation visualization apparatus 200 is specially configured by computer-coded instructions (e.g., computer program instructions) stored thereon, for example in the memory 204 and/or another component depicted and/or described herein and/or otherwise accessible to the improved aerial operation visualization apparatus 200, for performing the operations as depicted and described. In some embodiments, the improved aerial operation visualization apparatus 200 is in communication with one or more external apparatus(es), system(s), device(s), and/or the like, to perform one or more of the operations as depicted and described. For example, the improved aerial operation visualization apparatus 200 in some embodiments is in communication with an end-user computing device(s), client device(s), and/or the like. For purposes of simplifying the description, the process 1400 is described as performed by and from the perspective of the improved aerial operation visualization apparatus 200.

The process 1400 begins at operation 1402. At operation 1402, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to receive flight sensor data. In some embodiments, the flight sensor data is associated with an aerial vehicle operating within a particular real-world environment. The flight sensor data may embody one or more aspects(s) of the environment, the aerial vehicle and/or performance thereof, other aerial vehicle(s) and/or object(s) in or associated with the environment, and/or the like. In some embodiments, the flight sensor data includes at least orientation information, position information, and altitude information associated with an aerial vehicle. In some embodiments, the flight sensor data includes flight detail data, retrieved information associated with object(s), structure(s), and/or terrain in an environment, and/or the like.

In some embodiments, the improved aerial operation visualization apparatus 200 receives the flight sensor data from one or more sensor(s) onboard the aerial vehicle. Such sensor(s), for example of the sensor(s) 210, may be disposed within the aerial vehicle, on the exterior of the aerial vehicle, embodied by computing system(s) of the aerial vehicle, and/or the like. Additionally or alternatively, in some embodiments, the flight sensor data includes sensor data captured by one or more sensor(s) external from the aerial vehicle, for example which is then relayed to the improved aerial operation visualization apparatus 200 via one or more communications network(s). Additionally or alternatively still, in some embodiments, the flight sensor data includes data received from one or more other aerial vehicle(s) and/or data system(s) associated with the improved aerial operation visualization apparatus 200. For example, in some embodiments, the flight sensor data includes data received from other connected vehicle system(s) 104, flight management system(s) 106, and/or environment data system(s) 108. Such data may include flight detail data, other position(s) of aerial vehicle(s), and/or data defining location(s), size(s), and/or other aspect(s) of object(s), structure(s), and/or the like within the environment.

At optional operation 1404, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to generate a virtual environment. In some embodiments, the improved aerial operation visualization apparatus 200 generates the virtual environment based at least in part on the flight sensor data. Additionally or alternatively, in some embodiments, the improved aerial operation visualization apparatus 200 generates the virtual environment including one or more virtual element(s) corresponding to aspects of a corresponding real-world environment, for example an environment associated with the received flight sensor data. In some embodiments, the improved aerial operation visualization apparatus 200 generates a virtual environment including a virtual vehicle corresponding to a an aerial vehicle including or embodied by the improved aerial operation visualization apparatus 200 and operating in the corresponding real-world environment. Additionally or alternatively, in some embodiments, the improved aerial operation visualization apparatus 200 generates the virtual environment including a virtual representation of a landing zone. Additionally or alternatively, in some embodiments, the improved aerial operation visualization apparatus 200 generates the virtual environment including one or more virtual structure(s), terrain, object(s), and/or the like. The improved aerial operation visualization apparatus 200 in some such embodiments generates the one or more virtual element(s) at particular location(s) and/or with particular configuration(s) to accurately mirror the corresponding real-world environment, for example based at least in part on the flight sensor data.

At operation 1406, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to generate a virtual corridor. The virtual corridor in some embodiments is generated within a virtual environment representing or otherwise associated with a corresponding real-world environment. Alternatively or additionally, in some embodiments the virtual corridor is generated as a standalone data object based at least in part on one or more portion(s) of flight sensor data, for example to render on top of user interface element(s) depicting a real-world environment. In some embodiments, the improved aerial operation visualization apparatus 200 generates a virtual corridor embodying a volume within the virtual environment within which the aerial vehicle is safe to operate. In this regard, the aerial vehicle may safely operate within the real-world environment while within the virtual corridor depicted within the virtual environment. In some embodiments, the virtual corridor extends from a representation of a landing zone within a virtual environment. For example, in some embodiments, the virtual corridor embodies a cylindrical cone extending upwards from a virtual landing zone corresponding to a real-world landing zone of a real-world environment. In some embodiments, the improved aerial operation visualization apparatus 200 generates the virtual corridor based at least in part on a vehicle altitude from the received flight sensor data, an altitude difference between the aerial vehicle and the landing zone, vehicle attitude data indicating orientation, location, and/or the like, and/or data defining object(s) and/or portion(s) of the real-world environment (e.g., a location and size of a landing zone).

It will be appreciated that the virtual corridor may be generated based on predetermined configuration setting(s) and/or based at least in part on the flight sensor data. For example, in some embodiments, the virtual corridor is generated with a particular angle (up to a maximum angle) so long as the volume defined by that angle does not include other virtual object(s) of the environment. Additionally or alternatively, in some embodiments, the improved aerial operation visualization apparatus 200 generates the virtual corridor otherwise defined based at least in part on one or more flight regulation(s) and/or safety standard requirements, for example defining a distance from surrounding element(s) of the environment.

In some embodiments, the improved aerial operation visualization apparatus 200 maintains and/or updates one or more aspect(s) of the virtual environment. In some embodiments, for example, the improved aerial operation visualization apparatus 200 updates a position of a virtual vehicle corresponding to an aerial vehicle as new flight sensor data associated with the aerial vehicle is received. In this regard, in some embodiments the virtual vehicle accurately mirrors the real-time position, orientation, and/or the like of the corresponding aerial vehicle in the real-world environment as the aerial vehicle is maneuvered. Additionally or alternatively still, in some embodiments, the improved aerial operation visualization apparatus 200 updates a virtual indicator, such as an altitude indicator and/or a vehicle center indicator, as the virtual vehicle is updated to mirror the movement of a corresponding aerial vehicle in the real-world environment. Additionally or alternatively, in some embodiments, the improved aerial operation visualization apparatus 200 updates depiction of the virtual corridor as the aerial vehicle is maneuvered. For example, in some embodiments, the improved aerial operation visualization apparatus 200 alters one or more aspect(s) of the virtual corridor and/or generates one or more warning indicator(s) in circumstances where a virtual vehicle corresponding to an aerial vehicle deviates towards the boundary defined by the virtual corridor and/or operates outside the horizontal boundary defined by the virtual corridor.

At operation 1408, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to cause rendering of at least one user interface comprising at least one UAM visualization interface. In some embodiments, each user interface rendered includes at least one UAM visualization interface.

In some embodiments, the at least one UAM visualization interface depicts at least the virtual corridor. In some such embodiments, some or all of the at least one UAM visualization interface includes a representation depicting at least a portion of the virtual environment, the portion of the virtual environment including the virtual corridor. For example, in some embodiments, the improved aerial operation visualization apparatus 200 causes rendering of a UAM visualization interface that represents a depiction of the virtual environment from a particular perspective. For example, each UAM visualization interface in some embodiments depicts an egocentric view, exocentric view, and/or profile view of at least a portion of the virtual environment including the virtual corridor. Additionally or alternatively, in some embodiments, the representation of the virtual environment depicts a representation of the virtual vehicle, and/or one or more other virtual element(s) in the virtual environment. In some embodiments, the improved aerial operation visualization apparatus 200 generates each UAM visualization interface embodying a viewport from the perspective of a virtual camera configured and positioned within the virtual environment to provide a particular desired view of the improved aerial operation visualization apparatus 200. In some embodiments, the UAM visualization interface depicts a representation of the virtual environment from any one of a set of possible views. In some other embodiments, the UAM visualization interface depicts a representation of the virtual environment from a custom view configured by the user, configured specific for the associated aerial vehicle or a set of particular aerial vehicles (e.g., aerial vehicles of the same OEM, aerial vehicles in the same fleet, and/or the like), and/or otherwise customized utilizing one or more configuration settings for defining the viewport, camera settings, and/or the like.

In some embodiments, the user interface includes image data representing a real-world environment augmented based at least in part to include the virtual corridor. For example, in some embodiments, one or more UAM visualization interface is generated that includes captured image data depicting a particular landing zone. Based at least in part on the position of the aerial vehicle and/or a determined position of the landing zone, the improved aerial operation visualization apparatus 200 in some embodiments depicts a UAM visualization interface including the virtual corridor extending outwards from the landing zone. In this regard, in some such embodiments the improved aerial operation visualization apparatus 200 generates an augmented reality interface element that intuitively enables an operator to maneuver within the virtual corridor to perform a vertical landing.

In some embodiments, the improved aerial operation visualization apparatus 200 causes rendering of the at least one user interface to one or more display(s) of the aerial vehicle. For example, in some embodiments, the improved aerial operation visualization apparatus 200 renders a single user interface to a primary flight display of the aerial vehicle. In some such embodiments, the single user interface may include a single UAM visualization interface from a particular perspective (e.g., an egocentric view, an exocentric view, and/or a profile view for example). In some embodiments, the single user interface includes a plurality of UAM visualization interfaces as sub-interfaces rendered to the single display. For example, in some embodiments, the user interface includes a primary interface that covers most of the single display and includes a UAM visualization interface utilizing a first projection (e.g., an egocentric view for example), and includes one or more smaller interface(s) layered thereof embodying UAM visualization interface(s) from other perspective(s) (e.g., a profile view and/or an exocentric view). Alternatively or additionally, in some embodiments, the single user interface rendered to a single display includes two or more side-by-side UAM visualization interface(s) as sub-interfaces thereof. In this regard, in some such embodiments, a pilot may utilize the single display to gather a more complete situational awareness based on the multiple perspective(s), and control the aerial vehicle more safely accordingly.

In some embodiments, the improved aerial operation visualization apparatus 200 receives user input for rendering and/or de-rendering the virtual corridor specifically. In some such embodiments, depiction of the virtual corridor may be freely controlled by the operator of an aerial vehicle.

At optional operation 1410, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to cause rendering, to an additional display of the aerial vehicle, of a second user interface. In some embodiments, the second user interface includes at least a second UAM visualization interface that depicts a second representation of at least a second portion of the virtual environment. For example, in some embodiments, the second UAM visualization interface depicts the virtual environment from a second perspective that differs from the perspective associated with a first rendered UAM visualization interface. For example, in some embodiments, the improved aerial operation visualization apparatus 200 causes rendering of a primary interface embodying or including a first UAM visualization interface of a first projection to a primary flight display of an aerial vehicle, and causes rendering of a secondary interface embodying or including a second UAM visualization interface from a second perspective to a secondary flight display (e.g., a multi-function display) of the aerial vehicle. In this regard, the improved aerial operation visualization apparatus 200 may be specially configured to arrange the display(s) accessible to a pilot of the aerial vehicle and/or the user interface(s) rendered to those display(s) in a manner preferable to the pilot and/or that maximizes the situational awareness a pilot may obtain from visual inspection of the display(s) rather than the real-world environment. In some embodiments, for example, the improved aerial operation visualization apparatus 200 causes rendering of a first user interface including or embodying one or more UAM visualization interface(s) (e.g., one or more 3D views, such as an egocentric view and/or an exocentric view) to a primary flight display of an aerial vehicle. and causes rendering of a second user interface including or embodying one or more other UAM visualization interface(s) (e.g., one or more 2D views, such as a profile view) to a multi-function display of the aerial vehicle.

Figure 15:
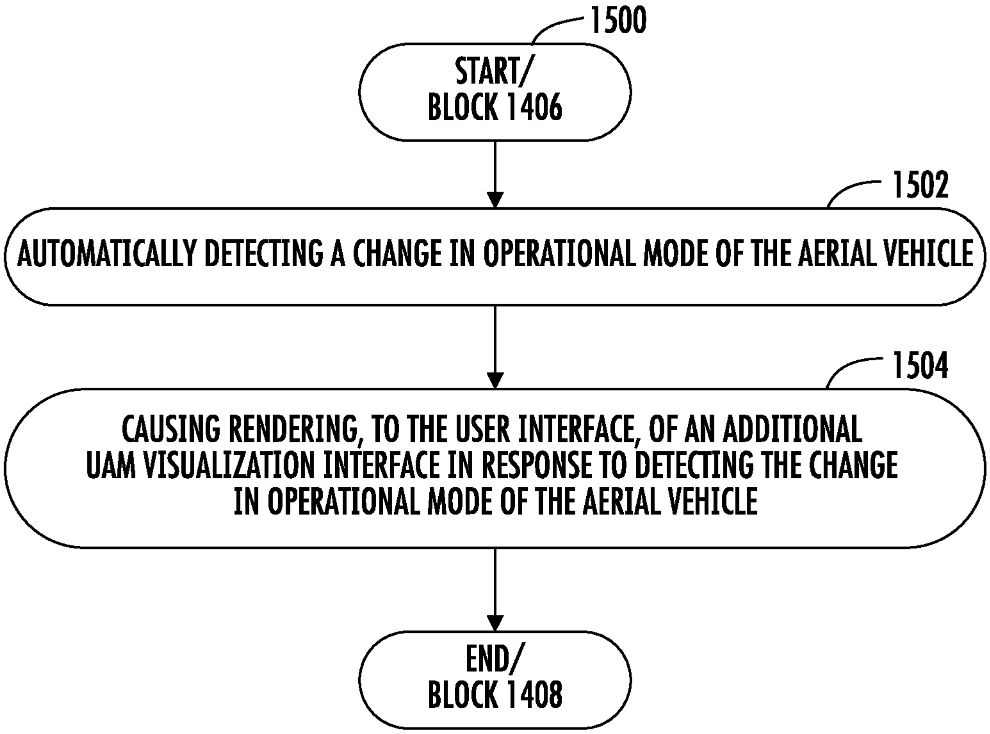
FIG. 15 illustrates a flowchart embodying operations of an example process for rendering to a user interface based at least in part on an operational mode change in accordance with at least some example embodiments of the present disclosure.

FIG. 15 illustrates a flowchart embodying operations of an example process for rendering to a user interface based at least in part on an operational mode change in accordance with at least some example embodiments of the present disclosure. Specifically, FIG. 15 depicts example operations of a process 1500. In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as the improved aerial operation visualization apparatus 200 alone or in communication with one or more other component(s), device(s), system(s), and/or the like. In this regard, in some such embodiments, the improved aerial operation visualization apparatus 200 is specially configured by computer-coded instructions (e.g., computer program instructions) stored thereon, for example in the memory 204 and/or another component depicted and/or described herein and/or otherwise accessible to the improved aerial operation visualization apparatus 200, for performing the operations as depicted and described. In some embodiments, the improved aerial operation visualization apparatus 200 is in communication with one or more external apparatus(es), system(s), device(s), and/or the like, to perform one or more of the operations as depicted and described. In some embodiments, the improved aerial operation visualization apparatus 200 is in communication with one or more external apparatus(es), system(s), device(s), and/or the like, to perform one or more of the operations as depicted and described. For example, the improved aerial operation visualization apparatus 200 in some embodiments is in communication with other connected vehicle system(s) 104, flight management system(s) 106, environment data system(s) 108, end-user client device(s), and/or the like. For purposes of simplifying the description, the process 1500 is described as performed by and from the perspective of the improved aerial operation visualization apparatus 200.

The process 1500 begins at operation 1502. In some embodiments, the process 1500 begins after one or more operations depicted and/or described with respect to any one of the other processes described herein. For example, in some embodiments as depicted, the process 1500 begins after execution of operation 1406. In this regard, some or all of the process 1500 may replace or supplement one or more blocks depicted and/or described with respect to any of the processes described herein. Upon completion of the process 1500, the flow of operations may terminate. Additionally or alternatively, as depicted, upon completion of the process 1500 in some embodiments, flow may return to one or more operation(s) of another process. For example, in some embodiments flow returns to the operation 1408 as depicted and described with respect to FIG. 14. It will be appreciated that, in some embodiments, the process 1500 embodies a sub-process of one or more other process(es) depicted and/or described herein, for example the process 1200.

At operation 1502, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to automatically detect a change in operational mode of the aerial vehicle. In some embodiments, the improved aerial operation visualization apparatus 200 detects a change in operational mode in response to user input received for triggering a change in operational mode of the aerial vehicle. In some embodiments, the improved aerial operation visualization apparatus 200 detects data event(s), trigger(s), and/or determination(s) that indicate a change in operational mode. For example, in some embodiments the improved aerial operation visualization apparatus 200 detects a change in operational mode based at least in part on one or more portion(s) of the flight sensor data captured, generated, and/or otherwise received by the improved aerial operation visualization apparatus 200. In some embodiments, the improved aerial operation visualization apparatus 200 detects a change in operational mode based at least in part on a change in direction, speed, and/or operational controls of the aerial vehicle, initiation of landing gear(s), and/or the like as indicated in flight sensor data.

In some embodiments, the improved aerial operation visualization apparatus 200 detects a change in operational mode based at least in part on flight detail data. For example, in some embodiments, the flight detail data includes or embodies flight path information defining particular segment(s) of a flight, and/or the process(es) at each of the particular segment(s). In this regard, the operational mode(s) may correspond to the particular process(es) and/or segment(s) of said flight detail data. Alternatively or additionally, in some embodiments, the improved aerial operation visualization apparatus 200 determines an operational mode and/or flight segment (e.g., to determine a corresponding appropriate operational mode) based at least in part on flight sensor data associated with the aerial vehicle. For example, in some such embodiments, the improved aerial operation visualization apparatus 200 determines the operational mode in which the aerial vehicle should be operating based at least in part on direction, speed, and/or other data associated with current maneuvering of the aerial vehicle.

At operation 1504, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to cause rendering, to the user interface, of an additional UAM visualization interface in response to detecting the change in the operational mode of the aerial vehicle. In some embodiments, for example, the additional UAM visualization interface depicts a representation of the virtual environment from a different perspective than one or more other rendered UAM visualization interface(s) in the user interface and/or another user interface. In some embodiments, the additional UAM visualization interface is rendered as a sub-interface of a user interface currently rendered via one or more display(s). The additional UAM visualization interface includes interface element(s) that enable a pilot to gain situational awareness relevant to the operational mode activated.

In one example context, the improved aerial operation visualization apparatus 200 causes rendering of the additional UAM visualization interface(s) in response to detecting initiation (e.g., a change to) of a vertical landing operational mode. In this regard, the additional UAM visualization interface(s) provide additional contextual information useful to the pilot for gaining a full situational awareness during such a vertical landing without requiring actual visual confirmation of aspect(s) of the real-world environment that may be blocked or otherwise not observable. For example, the additional UAM visualization interface(s) in some embodiments depict representation(s) of portion(s) of the environment beneath the aerial vehicle without requiring visual inspection by the pilot of such portion(s) of the environment, which may be blocked by the floor and/or a bottom portion of the aerial vehicle chassis. Alternatively or additionally, in another example context, the improved aerial operation visualization apparatus 200 causes rendering of the additional UAM visualization interface(s) in response to detecting initiation of a vertical takeoff operational mode. For example, in some such contexts, the additional UAM visualization interface(s) depict representation(s) of portion(s) of the environment above the aerial vehicle without requiring visual inspection by the pilot of such portion(s) of the environment, which may be blocked by a top portion of the aerial vehicle chassis. In this regard, the resulting user interface is decluttered during operational modes where such additional UAM visualization interface(s) are less relevant, thus improving the visual clarity of such user interface(s) and situational awareness that may be efficiently garnered from such user interface(s) by the pilot while in each respective operational mode(s) of the aerial vehicle.

Figure 16:
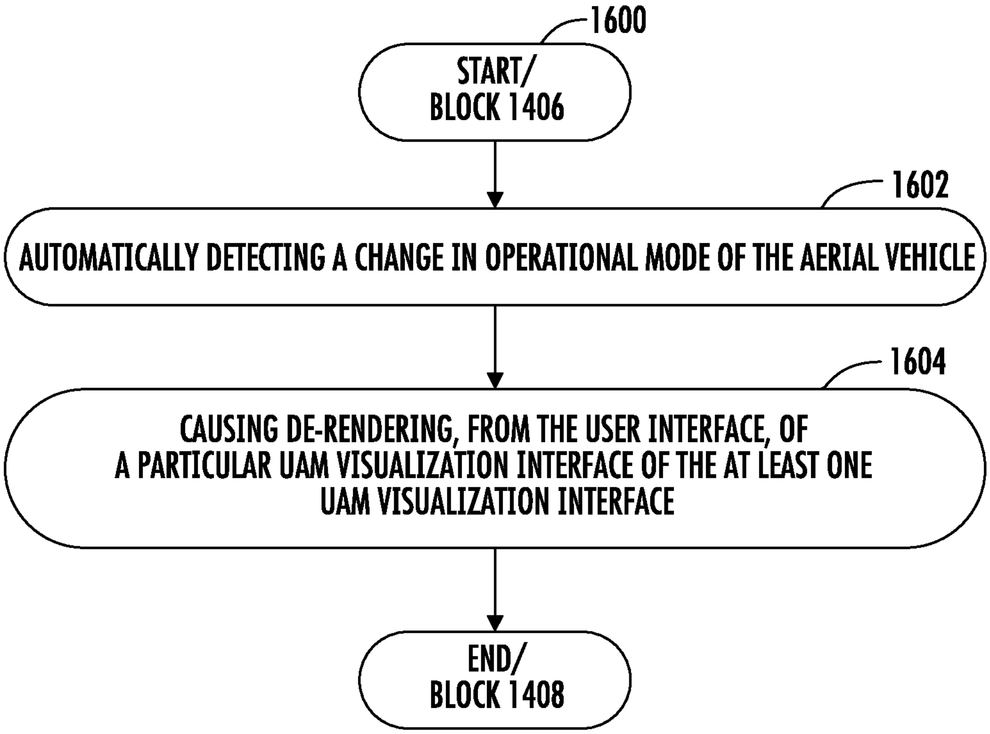
FIG. 16 illustrates a flowchart embodying operations of an example process for de-rendering from a user interface based at least in part on an operational mode change in accordance with at least some example embodiments of the present disclosure.

FIG. 16 illustrates a flowchart embodying operations of an example process for de-rendering from a user interface based at least in part on an operational mode change in accordance with at least some example embodiments of the present disclosure. Specifically, FIG. 16 depicts example operations of a process 1600. In some embodiments, the process 1600 is embodied by computer program code stored on a non-transitory computer-readable storage medium of a computer program product configured for execution to perform the process as depicted and described. Alternatively or additionally, in some embodiments, the process 1600 is performed by one or more specially configured computing devices, such as the improved aerial operation visualization apparatus 200 alone or in communication with one or more other component(s), device(s), system(s), and/or the like. In this regard, in some such embodiments, the improved aerial operation visualization apparatus 200 is specially configured by computer-coded instructions (e.g., computer program instructions) stored thereon, for example in the memory 204 and/or another component depicted and/or described herein and/or otherwise accessible to the improved aerial operation visualization apparatus 200, for performing the operations as depicted and described. In some embodiments, the improved aerial operation visualization apparatus 200 is in communication with one or more external apparatus(es), system(s), device(s), and/or the like, to perform one or more of the operations as depicted and described. In some embodiments, the improved aerial operation visualization apparatus 200 is in communication with one or more external apparatus(es), system(s), device(s), and/or the like, to perform one or more of the operations as depicted and described. For example, the improved aerial operation visualization apparatus 200 in some embodiments is in communication with an end-user computing device(s), client device(s), and/or the like. other connected vehicle system(s) 104, flight management system(s) 106, environment data system(s) 108, end-user client device(s). For purposes of simplifying the description, the process 1600 is described as performed by and from the perspective of the improved aerial operation visualization apparatus 200.

The process 1600 begins at operation 1602. In some embodiments, the process 1600 begins after one or more operations depicted and/or described with respect to any one of the other processes described herein. For example, in some embodiments as depicted, the process 1600 begins after execution of operation 1406. In this regard, some or all of the process 1500 may replace or supplement one or more blocks depicted and/or described with respect to any of the processes described herein. Upon completion of the process 1600, the flow of operations may terminate. Additionally or alternatively, as depicted, upon completion of the process 1600 in some embodiments, flow may return to one or more operation(s) of another process. For example, in some embodiments flow returns to the operation 1408 as depicted and described with respect to FIG. 14. It will be appreciated that, in some embodiments, the process 1600 embodies a sub-process of one or more other process(es) depicted and/or described herein, for example the process 1400.

At operation 1602, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to automatically detect a change in operational mode of the aerial vehicle. In some embodiments, the improved aerial operation visualization apparatus 200 detects a change in operational mode in response to user input received for triggering a change in operational mode of the aerial vehicle. In some embodiments, the improved aerial operation visualization apparatus 200 detects data event(s), trigger(s), and/or determination(s) that indicate a change in operational mode. For example, in some embodiments the improved aerial operation visualization apparatus 200 detects a change in operational mode based at least in part on one or more portion(s) of the flight sensor data captured, generated, and/or otherwise received by the improved aerial operation visualization apparatus 200. In some embodiments, the improved aerial operation visualization apparatus 200 detects a change in operational mode based at least in part on a change in direction, speed, and/or operational controls of the aerial vehicle, initiation of landing gear(s), and/or the like as indicated in flight sensor data.

At operation 1604, the improved aerial operation visualization apparatus 200 includes means such as the sensor(s) 210, navigation circuitry 212, flight operations circuitry 214, virtual management circuitry 216, communications circuitry 208, input/output circuitry 206, and/or processor 202, or a combination thereof, to cause de-rendering, from the user interface, of a particular UAM visualization interface of the at least one UAM visualization interface rendered to the user interface. In some embodiments, at least the particular UAM visualization interface is de-rendered in response to detecting the change in the operational mode of the aerial vehicle. In some embodiments, for example, the particular UAM visualization interface(s) that is/are de-rendered from the user interface are based at least in part on the operational mode from which the improved aerial operation visualization apparatus 200 detected a change, and/or the new operational mode to which the improved aerial operation visualization apparatus 200 detected a change. For example, in some embodiments a UAM visualization interface that is configured for rendering while an aerial vehicle is operating in a particular operational mode (e.g., a vertical takeoff or vertical landing mode) is de-rendered upon changing to another operational mode (e.g., a forward-flying mode). Such de-rendered UAM visualization interface(s) may be less relevant to the pilot while operating the aerial vehicle in the new operational mode. In some embodiments, the improved aerial operation visualization apparatus 200 maintains a set of UAM visualization interface(s) (e.g., from different views) that are to be rendered or renderable (e.g., upon request by a user via user input) while the aerial vehicle is operating in each operational mode.

In some such embodiments, de-rendering the particular UAM visualization interface(s) de-clutters the user interface. Such de-cluttered user interface(s) enable a pilot to more efficiently gain a complete situational awareness for operating the aerial vehicle without unnecessary, distracting, and/or unhelpful sub-interfaces. Additionally, such de-rendering enables remaining sub-interfaces of a particular user interface to be rendered with more space and/or greater prominence on the same size display.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In some embodiments, some of the operations above may be modified or further amplified. Furthermore, in some embodiments, additional optional operations may be included.

Modifications, amplifications, or additions to the operations above may be performed in any order and in any combination.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one non-transitory memory having computer-coded instructions stored thereon that, in execution with the at least one processor, cause the apparatus to:

receive flight sensor data associated with an aerial vehicle operating in an environment;

generate a virtual environment based at least in part on the flight sensor data;

generate, within the virtual environment, a virtual corridor defining a volume within which the aerial vehicle is safe to operate, the virtual corridor extending from a landing zone of the environment; and cause rendering of a user interface comprising at least one visualization interface depicting at least the virtual corridor together with a transition point at which a vertical takeoff is to end or a vertical landing is to commence is indicated, wherein the apparatus renders the user interface comprising the at least one visualization interface depicting the at least the virtual corridor together with the transition point while the aerial vehicle is operating in a transitional operational mode that is between a forward-flying operational mode and a vertical-flying operational mode.

2. The apparatus according to claim 1, wherein the user interface comprises a plurality of visualization interfaces, the plurality of visualization interfaces comprising:

an egocentric view depicting a first projection of the virtual environment, the first projection from a virtual vehicle corresponding to the aerial vehicle within the virtual corridor;

an exocentric view depicting a second projection of the virtual environment, the exocentric view comprising a representation of the virtual vehicle within the virtual corridor; and a profile view depicting a third projection of the virtual environment, the profile view comprising a side profile of the virtual vehicle within the virtual corridor.

3. The apparatus according to claim 1, the apparatus further caused to:

automatically detect a change in operational mode of the aerial vehicle from a flight operational mode to a vertical landing operational mode; and cause rendering, to the user interface, of an additional visualization interface in response to detecting the change in operational mode of the aerial vehicle, the additional visualization interface comprising a profile view of a virtual vehicle corresponding to the aerial vehicle or an exocentric view of the virtual vehicle corresponding to the aerial vehicle, wherein the virtual vehicle is depicted within the virtual corridor.

4. The apparatus according to claim 1, the apparatus further caused to:

cause rendering, to an additional flight display of the aerial vehicle, of a second user interface comprising at least a second visualization interface depicting a second representation of at least a second portion of the virtual environment.

5. The apparatus according to claim 1, wherein the virtual corridor is generated based at least in part on the flight sensor data and flight detail data associated with the aerial vehicle.

6. The apparatus according to claim 1, wherein the virtual corridor comprises a plurality of range indications, each range indication depicting a range between the range indication and the landing zone.

7. An apparatus comprising at least one processor and at least one non-transitory memory having computer-coded instructions stored thereon that, in execution with the at least one processor, cause the apparatus to:

receive flight sensor data associated with an aerial vehicle operating in an environment;

generate a virtual environment based at least in part on the flight sensor data;

generate, within the virtual environment, a virtual corridor defining a volume within which the aerial vehicle is safe to operate, the virtual corridor extending from a landing zone of the environment; and cause rendering of a user interface comprising at least one visualization interface depicting at least the virtual corridor together with a transition point, wherein the transition point is associated with a point at which the aerial vehicle is to transition between a forward-flying operational mode and a vertical-flying operational mode.

8. The apparatus according to claim 7, wherein the flight sensor data comprises image data associated with at least a portion of the environment, and wherein at least one of the at least one visualization interface comprises the virtual corridor augmenting the image data.

9. The apparatus according to claim 7, wherein at least one of the at least one visualization interface comprises at least one deviation indicator depicted with respect to the virtual corridor, the at least one deviation indicator indicating an offset from a center point of the landing zone in at least one direction.

10. The apparatus according to claim 7, wherein:

the user interface comprises a virtual representation of a plurality of flight markers, the plurality of flight markers comprise a transition from a first marker to a second marker, and the first marker has a first pattern and the second marker has a second pattern, wherein the first pattern is visually distinguishable from the second pattern.

11. The apparatus according to claim 7, wherein the user interface further comprises a primary altitude indicator corresponding to an altitude of the aerial vehicle, wherein the primary altitude indicator is rendered overlapping a rendered representation of the virtual corridor.

12. The apparatus according to claim 7, wherein the volume defined by the virtual corridor is a substantially vertical volume within which the aerial vehicle is safe to operate.

13. The apparatus according to claim 7, wherein the virtual corridor defines a volume within which the aerial vehicle is safe to operate in the vertical-flying operational mode, and the transition point is located at a top of the virtual corridor.

14. The apparatus according to claim 7, wherein the user interface comprises a plurality of visualization interfaces, the plurality of visualization interfaces comprising:

an egocentric view depicting a first projection of the virtual environment, the first projection from a virtual vehicle corresponding to the aerial vehicle within the virtual corridor;

an exocentric view depicting a second projection of the virtual environment, the exocentric view comprising a representation of the virtual vehicle within the virtual corridor; and a profile view depicting a third projection of the virtual environment, the profile view comprising a side profile of the virtual vehicle within the virtual corridor.

15. The apparatus according to claim 7, the apparatus further caused to:

automatically detect a change in operational mode of the aerial vehicle from a flight operational mode to a vertical landing operational mode; and cause rendering, to the user interface, of an additional visualization interface in response to detecting the change in operational mode of the aerial vehicle, the additional visualization interface comprising a profile view of a virtual vehicle corresponding to the aerial vehicle or an exocentric view of the virtual vehicle corresponding to the aerial vehicle, wherein the virtual vehicle is depicted within the virtual corridor.

16. The apparatus according to claim 7, the apparatus further caused to:

cause rendering, to an additional flight display of the aerial vehicle, of a second user interface comprising at least a second visualization interface depicting a second representation of at least a second portion of the virtual environment.

17. The apparatus according to claim 7, wherein the virtual corridor is generated based at least in part on the flight sensor data and flight detail data associated with the aerial vehicle.

18. The apparatus according to claim 7, wherein the virtual corridor comprises a plurality of range indications, each range indication depicting a range between the range indication and the landing zone.

19. An apparatus comprising at least one processor and at least one non-transitory memory having computer-coded instructions stored thereon that, in execution with the at least one processor, cause the apparatus to:

receive flight sensor data associated with an aerial vehicle operating in an environment;

generate a virtual environment based at least in part on the flight sensor data;

generate, within the virtual environment, a virtual corridor defining a volume within which the aerial vehicle is safe to operate, the virtual corridor extending from a landing zone of the environment; and cause rendering of a user interface comprising at least one visualization interface depicting at least the virtual corridor together with a transition point at which a vertical landing is to commence is indicated, wherein the user interface comprises a line depicting a flight path of the aerial vehicle operating in a forward-flying operational mode, and wherein the transition point is positioned on the flight path.

* * * * *